(12) United States Patent
Chen et al.

(10) Patent No.: US 11,838,895 B2
(45) Date of Patent: Dec. 5, 2023

(54) METHOD USED BY UE TO COMMUNICATE TO BASE STATION THROUGH M-TRP IN UNLICENSED BAND AND UE USING THE SAME

(71) Applicant: Acer Incorporated, New Taipei (TW)

(72) Inventors: Jen-Hsien Chen, New Taipei (TW); Chien-Min Lee, New Taipei (TW); Li-Chung Lo, New Taipei (TW)

(73) Assignee: Acer Incorporated, New Taipei (TW)

( * ) Notice: Subject to any disclaimer, the term of this patent is extended or adjusted under 35 U.S.C. 154(b) by 195 days.

(21) Appl. No.: 17/377,384

(22) Filed: Jul. 16, 2021

(65) Prior Publication Data
US 2022/0070824 A1   Mar. 3, 2022

Related U.S. Application Data

(60) Provisional application No. 63/072,242, filed on Aug. 31, 2020.

(51) Int. Cl.
*H04W 72/02*    (2009.01)
*H04W 24/08*    (2009.01)
*H04W 72/0446*  (2023.01)
*H04W 72/044*   (2023.01)
*H04W 72/23*    (2023.01)

(52) U.S. Cl.
CPC ........... *H04W 72/02* (2013.01); *H04W 24/08* (2013.01); *H04W 72/046* (2013.01); *H04W 72/0446* (2013.01); *H04W 72/23* (2023.01)

(58) Field of Classification Search
CPC . H04W 72/02; H04W 24/08; H04W 72/0446; H04W 72/046; H04W 72/23; H04W 16/14; H04W 74/006; H04W 72/569; H04W 72/20; H04W 72/56; H04W 74/0808; H04L 5/0064; H04L 5/0035;
(Continued)

(56) References Cited

U.S. PATENT DOCUMENTS

2019/0379506 A1   12/2019  Cheng
2021/0168779 A1*  6/2021   Mondal ................. H04L 5/0035
(Continued)

FOREIGN PATENT DOCUMENTS

WO   2020090059   5/2020
WO   2020150641   7/2020
WO   2021021401   2/2021

OTHER PUBLICATIONS

Oppo, "FL summary for Multi-TRP/Panel Transmission", 3GPP TSG RAN WG1#100bis, R1-2002406, Apr. 2020, pp. 1-34 (Year: 2020).*
(Continued)

*Primary Examiner* — Lan-Huong Truong
(74) *Attorney, Agent, or Firm* — JCIPRNET

(57) ABSTRACT

The disclosure is directed to a method used by a user equipment (UE) to communicate to a base station through a M-TRP in an unlicensed band and a UE using the same method. In one of the exemplary embodiments, the disclosure is directed to a method used by a UE to communicate to a base station through a M-TRP in an unlicensed band. The method would include not limited to: receiving, for a communication operation with a network, a configuration comprising multiple CORESETPoolIndexes; and receiving a PDCCH according to the configuration.

18 Claims, 45 Drawing Sheets

(58) Field of Classification Search
CPC ..... H04L 5/0053; H04L 5/003; H04L 5/0048; H04B 7/024; H04B 17/373
See application file for complete search history.

(56) References Cited

U.S. PATENT DOCUMENTS

2023/0027512 A1* 1/2023 Cirik ............... H04L 5/0048
2023/0076897 A1* 3/2023 Svedman ........... H04W 72/23
2023/0091462 A1* 3/2023 Babaei ............ H04W 72/0446

OTHER PUBLICATIONS

Samsuang, "Summary of email Discussion for Rel. 17 enhancements on MINO for NR", 3GPP TSG RAN Meeting #86 RP-192435, Dec. 2019, pp. 1-3.
Apple Inc., "Remaining Issues for Multi-TRP Enhancement", 3GPP TSG-RAN WG1 Meeting #102-e R1-2006494, Aug. 2020, pp. 1-4.
Qualcomm Incorporated, "Multi-TRP Enhancements", 3GPP TSG-RAN WG1 Meeting #99 R1-1912967, Nov. 2019, pp. 1-4.
"Search Report of Europe Counterpart Application", dated Jan. 24, 2022, pp. 1-12.
Oppo, "FL summary for Multi-TRP/Panel Transmission", 3GPP TSG RAN WG1#100bis , R1-2002406, Apr. 2020, pp. 1-34.
Vivo, "Remaining issues on Multi-TRP operation", 3GPP TSG RAN WG1#102-e, R1-2005354, Aug. 2020, pp. 1-12.
Samsung, "On Rel. 16 multi-TRP/panel tranmission", 3GPP TSG RAN WG1#101-e , R1-2003881, May-Jun. 2020, pp. 1-14.
Moderator (Oppo), "FL summary #2 for Multi-TRP/Panel Transmission", 3GPP TSG RAN WG1 #101 e-Meeting 1-2004719, May 25-Jun. 5, 2020, pp. 1-35.
Qualcomm Incorporated, "Multi-TRP Enhancements", 3GPP TSG-RAN WG1 Meeting #102-e, Aug. 17-28, 2020, pp. 1-11.
Technical Specification Group Radio Access Network., "Physical layer procedures for data", 3GPP TS 38.214 V16.2.0, Jun. 2020, pp. 1-163.
Technical Specification Group Radio Access Network., "Physical layer procedures for control", 3GPP TS 38.213 V16.2.0, Jun. 2020, pp. 1-176.
"Office Action of Australia Counterpart Application", dated Sep. 8, 2022, p. 1-p. 6.

* cited by examiner

| bit | Time period |
|---|---|
| 00 | 8 symbols |
| 01 | 5 slots |
| 10 | 9 symbols + 4 slots |
| 11 | 6 symbol + 10 slots |

FIG. 37

METHOD USED BY UE TO COMMUNICATE TO BASE STATION THROUGH M-TRP IN UNLICENSED BAND AND UE USING THE SAME

CROSS REFERENCE TO RELATED APPLICATION

This application claims the priority benefit of U.S. provisional application Ser. No. 63/072,242, filed on Aug. 31, 2020. The entirety of the above-mentioned patent application is hereby incorporated by reference herein and made a part of specification.

TECHNICAL FIELD

The disclosure is directed to a method used by a user equipment (UE) to communicate to a base station through a multiple transmission and reception point (M-TRP) in an unlicensed band and a UE using the same method.

BACKGROUND

Currently, in the fifth-generation (5G) communication system and beyond, a next generation Node B (gNB) is capable of configuring a UE to connect to a network through an unlicensed spectrum through one or more TRPs. FIG. 1 shows a gNB configuring a UE to be scheduled to communicate with a network through one or multiple of TRPs. The M-TRP in FIG. 1 may include not limited to TRP #0, TRP #1, TRP #2, TRP #3, and etc. The gNB 101 may configure the UE 102 to be scheduled by one of the M-TRP by specifying the CORSETPoolIndex parameter to a UE as each CORSETPoolIndex parameter corresponds to a different M-TRP. Thus, a gNB 101 may configure the UE 102 to be scheduled by multiple TRPs by specifying multiple CORESETPoolIndexes to a UE 102. Also, each TRP could be associated with a different quasi-colocation assumption (QCL). In the example of FIG. 1, TRP #0 is has been QCLed to correspond to reference signal (RS) #0, TRP #1 has been QCLed to correspond to RS #1, and so forth. The interference between each TRP from the configured M-TRP is typically low.

FIG. 2 shows a UE reporting the result of a quality measurement to a gNB. When operating within a high frequency band such as 60 Gigahertz (GHz), before connecting to the gNB 202 in an unlicensed band, the UE 201 may first perform a signal quality measurement for a unlicensed serving cell or a bandwidth part (BWP), and the UE 201 may transmit a signal quality report of the signal quality measurement to the gNB 202. The signal quality parameters included in a signal quality report may include not limited to received signal strength indication (RSSI) metrics, channel occupancy report, connection or load metric, and etc. The UE 201 may transmit different sets of signal quality parameters of different reference signals to a gNB 202. For example, a first set of signal quality parameters could be associated with reference signal (RS) #0 203, and the second set of signal quality parameters could be associated with RS #1 204.

When communicating in an unlicensed spectrum, the challenge is that there may exist a time period when a gNB may not provide any downlink (DL) services. One reason could be related to the power consumption of a UE when the UE monitors a physical downlink control channel (PDCCH) within that time period. To overcome such issue, there could be two search space set (SSS) groups configured for the UE.

FIG. 3 shows an example of a UE switching between two SSS groups when connecting to a network in an unlicensed band. During the first time slot 301, the UE may monitor a first PDCCH which corresponds to SSS group #1 while the first time slot 301 is a part of the channel occupancy time (COT) of the gNB. During the second time slot 302, the UE may monitor a second PDCCH which corresponds to SSS group #0, but the gNB happens to not provide any service at some point during the second time slot. During the third time slot 303, the same pattern repeats as the first time slot 301 and thus the UE would switch back from monitoring SSS group #0 into monitoring SSS group #1. Essentially, after first time slot 301, the UE would switch from monitoring the first PDCCH in SSS group #1 to monitoring the second PDCCH in SSS group #0. After the second time slot 302, the UE would switch from monitoring the second PDCCH back in SSS group #0 to the first PDCCH in SSS group #1. as the pattern may then continue. In this SSS group switching scheme, since the frequency of monitoring the PDCCH in SSS group #0 is less than in SSS group #1, the UE may reduce the burden of monitoring a PDCCH, and the UE may release the PDCCH monitoring overhead that was being monitored after switching to another PDCCH but at the same time the UE would still be able to connect to the network while the gNB may sometimes not provide any DL services.

To further increase transmission efficiency when operating in unlicensed spectrum, a UE may adopt a beam-based operation which is available for the 5G communication system and beyond. Since the 5G system operates under a high frequency than its predecessors, the beam-based operation is adopted to minimizes transmission losses. FIG. 4 shows a comparison between omni-directional sensing and directional sensing. Performing listen before talk (LBT) is necessary before any transmission while operating in unlicensed spectrum. However, performing LBT under omnidirectional sensing would more likely be interfered with and resulted in failures. Thus, a directional transmission from a first UE to be received by a directional sensing second UE would succeed more often as shown in the right side of FIG. 4 than a directional transmission from a first UE to be received by an omni-directional sensing second UE as shown in the left side of FIG. 4.

An example of a beam-based operation is shown in FIG. 5 which illustrates a UE performing a beam-based operation through at least two M-TRPs. Referring to FIG. 5, a UE could be scheduled by TRP #0 through a first beam 501 and TRP #1 through a second beam 502. In the first beam 501, there is a listen before talk (LBT) time slot, LBT0 to be followed by the TRP #0's COT during which the UE may transmit and receive information with the TRP #0. In the second beam 502, there is a LBT time slot, LBT1 to be followed by the TRP #1's COT during which the UE may transmit and receive information with the TRP #1. As shown in FIG. 5, the COT of the gNB may the combination of TRP #0's COT and TRP #1's COT. Therefore, operating under a beam-based operation means would likely result in more transmission opportunities. For example, a gNB may start to service a UE by utilizing TRP #0's COT, and when the TRP #0's COT is coming to an end, the TRP #1's COT would be switched to service the UE.

When operating under a beam-based operation, a gNB may configure multiple CORESETPoolIndexes (i.e. M-TRP) to increase the transmission probability in unlicensed spectrum at a high frequency band. A UE may also contain one or multiple panels for communicating with the M-TRP as each panel may include a separate set of millimeter wave hardware transceivers. In the example of FIG. 6 the first UE 601 contains only one physical panel or has only one physical panel available while the second UE 602 contains multiple panels or has multiple physical panels available. As shown in FIG. 6 the first UE 601 may perform a DL reception associated with one RS at a time by using panel #0 while the second UE 602 may perform a DL reception associated with one RS by using panel #0 and another DL reception associated with another RS by using panel #1 simultaneously.

SUMMARY OF THE DISCLOSURE

Accordingly, the disclosure is directed to a method used by a user equipment (UE) to communicate to a base station through a multiple transmission and reception point (M-TRP) in an unlicensed band and a UE using the same method.

In one of the exemplary embodiments, the disclosure is directed to a method used by a UE to communicate to a base station through a M-TRP in an unlicensed band. The method would include not limited to: receiving, for a communication operation with a network, a configuration comprising multiple CORESETPoolIndexes; and receiving a physical downlink control channel (PDCCH) according to the configuration.

In one of the exemplary embodiments, the disclosure is directed to a UE which includes not limited to: a transmitter, a receiver, and a processor coupled to the transmitter and the receiver. The processor is configured at least to: receive, via the receiver for a communication operation with a network, a configuration comprising multiple CORESETPoolIndexes, and receive, via the receiver, a physical downlink control channel (PDCCH) according to the configuration.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 37 illustrates an RRC configuration table according to an exemplary embodiment of the disclosure.

DETAILED DESCRIPTION OF DISCLOSED EMBODIMENTS

Figure 1:
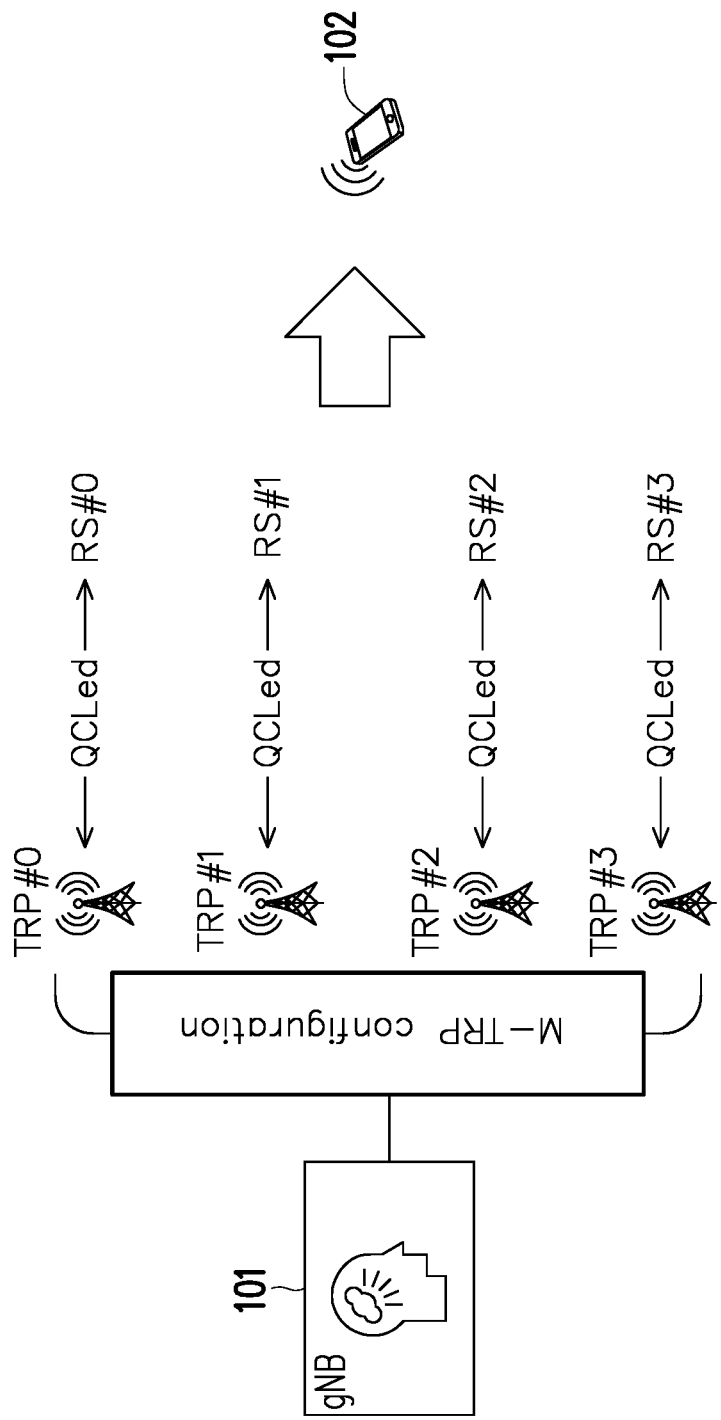
FIG. 1 shows a gNB configuring a UE to connect to one or multiple of the M-TRPs.
Figure 2:
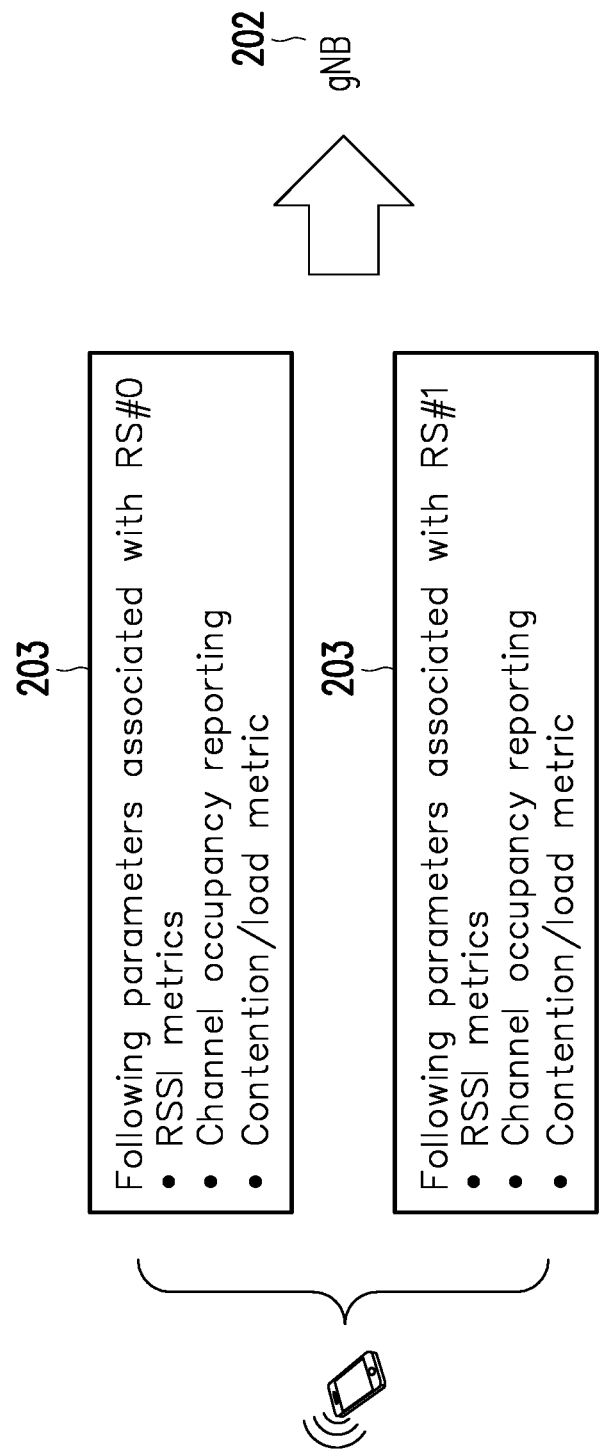
FIG. 2 shows a UE reporting the result of a quality measurement to a gNB.
Figure 3:
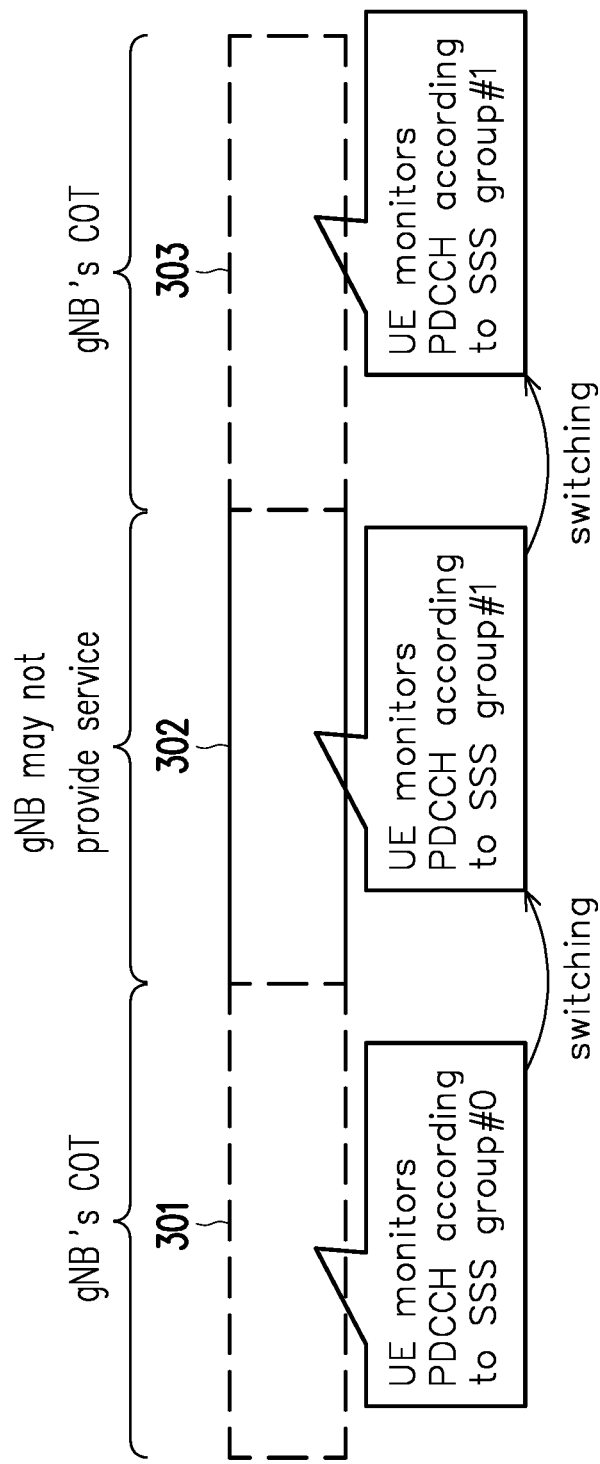
FIG. 3 shows an example of a UE switching between two SSS groups when connecting to a network in an unlicensed band.
Figure 4:
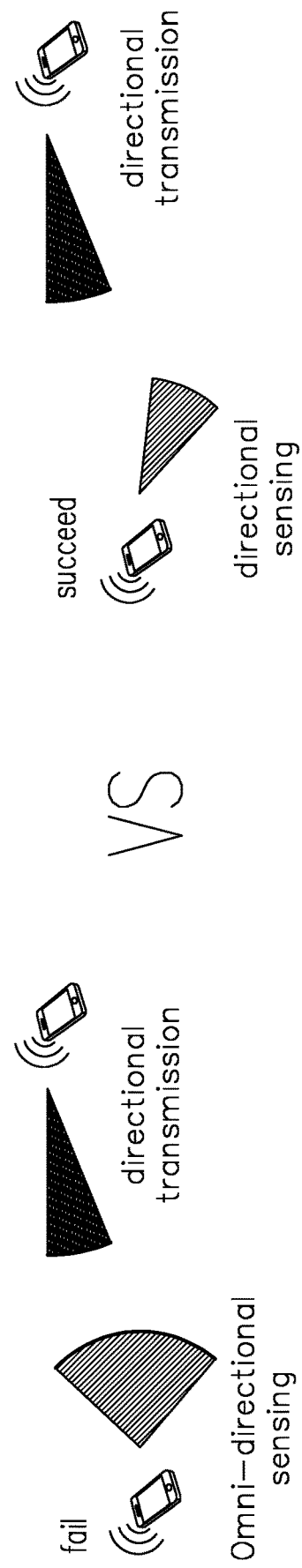
FIG. 4 shows a comparison between omni-directional sensing and directional sensing.
Figure 5:
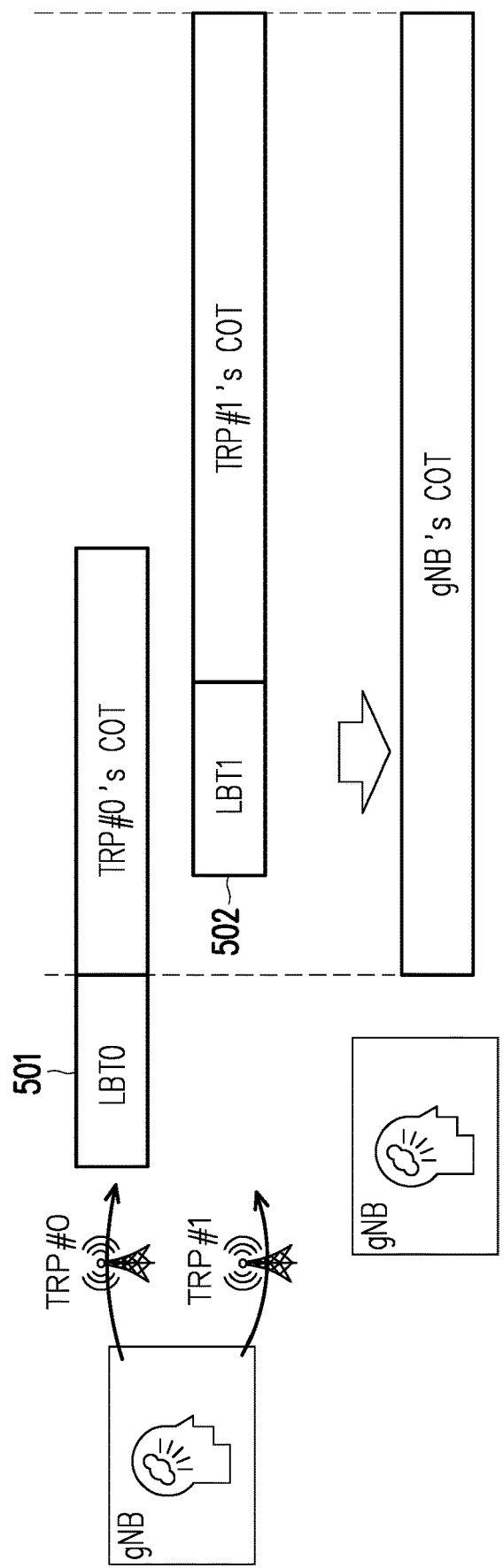
FIG. 5 illustrates a UE performing a beam-based operation through at least two M-TRPs.
Figure 6:
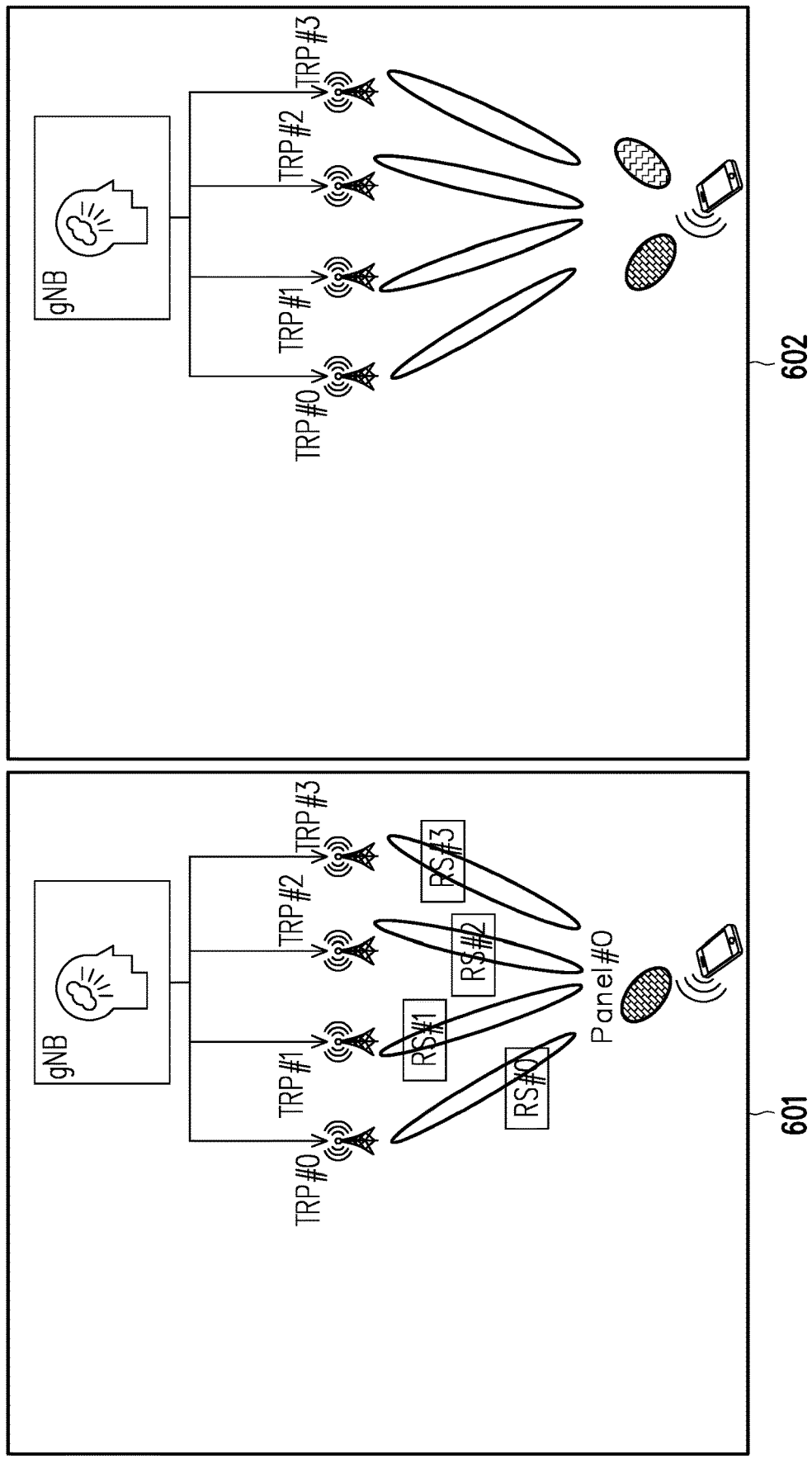
FIG. 6 illustrates a UE having one panel in comparison with another UE having multiple panels.

Reference will now be made in detail to the present exemplary embodiments of the disclosure, examples of which are illustrated in the accompanying drawings. Wherever possible, the same reference numbers are used in the drawings and the description to refer to the same or like parts.

In this disclosure, a UE could be scheduled by one TRP at a time such as when the UE has one panel available, and such UE could be scheduled according to the priority of the TRP and the parameter availabilityTRP field. The UE may also be scheduled by multiple TRPs at a time such as when the UE has multiple panels available, and such UE could be scheduled through enhanced physical downlink control channel (PDCCH) monitoring by information sharing among multiple M-TRPs. When the UE operates under a listen before talk (LBT) mode, the UE could be capable of supporting spatial domain multiplexing of different beams, and such as UE may use one LBT beam to cover all transmission beams or use multiple LBT beams to cover multiple transmission beams.

It should be noted that in this disclosure, a next generation Node B (gNodeB or gNB) could also be or be substituted as a cell, a serving cell, a TRP, an unlicensed cell, an unlicensed serving cell, an unlicensed TRP, a gNB, an evolved NodeB (eNB), and etc. Even though this disclosure provides various exemplary embodiment, it should apparent for an ordinary person skilled in the art that this disclosure may include combinations of such embodiments. Also, it would be apparent that the applications of many concepts in this disclosure could be extended to a licensed serving cell. A TRP in this document could be associated with a CORESETPoolIndex, where CORESET stands for a control resource set. A panel in this disclosure could be associated with a CORESETPoolIndex group such that a UE may perform PDCCH monitoring corresponding to the CORESETPoolIndex group via the panel. A high frequency band in this disclosure could be but not limited to, for example, 60 GHz. A beam-based operation in this disclosure may include not limited to a directional LBT operation. A UE turning off a panel may include physically turning off the panel but also may imply that the UE stop monitoring the PDCCH corresponding to the panel while a UE turning on a panel may imply that the UE may start monitoring the PDCCH corresponding to the panel.

The shorthand LBT #A in this disclosure may imply that a device performs a direction LBT associated with a "A" beam where the "A" beam could be quasi-colocated (QLCed) with a reference signal (RS) such as a synchronization signal block (SSB), a channel state information reference signal (CSI-RS), and etc. A group common (GC) PDCCH (GC-PDCCH) in this disclosure may imply that the downlink control indicator (DCI) format 2_0 is to be assumed. A UE monitoring a PDCCH in this disclosure may imply that the UE monitors PDCCH according to a search space where the search space set may have a group index 0, may have a group index 1, may not have any group index, or the group index is to be indicated by a gNB.

Figure 7:
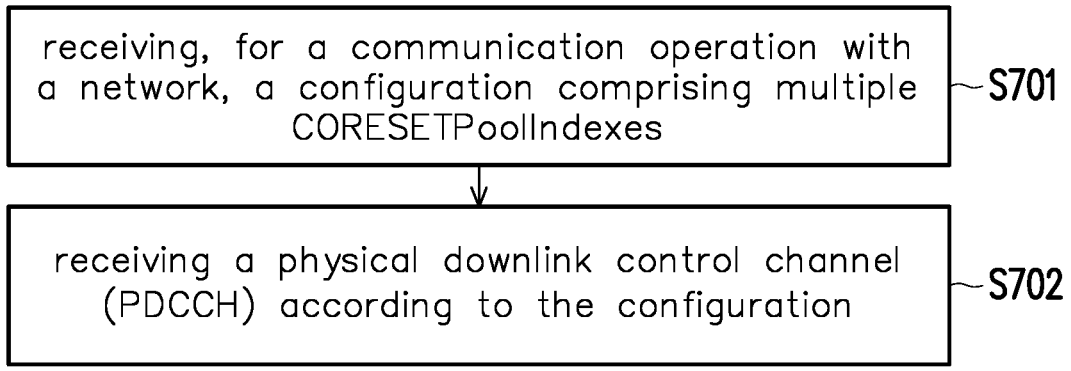
FIG. 7 illustrates a method used by a UE to communicate to a base station through a M-TRP in an unlicensed band an according to an exemplary embodiment of the disclosure.

In order to resolve the above described technical problem and to improve upon the mechanism a UE connects to a network in a beam-based operation through an unlicensed spectrum by taking the hardware capability of the UE into account, the disclosure provides a method used by a UE to communicate to a base station through a M-TRP in an unlicensed band and a UE using the same method. FIG. 7 illustrates a method used by a UE to communicate to a base station through a M-TRP in an unlicensed band an according to an exemplary embodiment of the disclosure. In step S701, the UE may receive, for a communication operation with a network, a configuration comprising multiple CORESETPoolIndexes. In step S702, the UE may receive a PDCCH according to the configuration.

According to various exemplary embodiments to be described latter parts of the disclosure, each of the CORESETPoolIndexes could be associated with a priority. Each of the CORESETPoolIndexes may also be associated with a CORESETPoolIndex group. The above described PDCCH may correspond to a CORESETPoolIndex which has a highest priority. The highest priority is corresponding to a CORESETPoolIndex group.

According to various exemplary embodiments, the UE may further receive a PDCCH corresponding to each CORESETPoolIndex of the multiple CORESETPoolIndexes. Each CORESETPoolIndex of the multiple CORESETPoolIndexes may correspond to a CORESETPoolIndex group. From the PDCCH, the UE may determine an availability information which may include a first binary value indicating a valid resource for the CORESETPoolIndex. The availability information may also correspond to a CORESETPoolIndex and comprises a second binary value indicating no valid resource for the CORESETPoolIndex. The above described valid resource could be a time period indicated by a gNB. The time period may have a unit of a symbol, a slot, or a millisecond.

According to various exemplary embodiments, the UE may further stop monitoring the PDCCH corresponding to the CORESETPoolIndex in response to the availability information indicating no valid resource for the CORESETPoolIndex. Similarly, the UE may further stop monitoring a PDCCH corresponding to a first CORESETPoolIndex of the multiple CORESETPoolIndexes, if a first COT corresponding to the first CORESEPoolIndex is valid as indicated by the availability information and has a lower priority than a second COT corresponding to a second CORESETPoolIndex of the multiple CORESETPoolIndexes, where the second COT corresponding to the second CORESETPoolIndex is valid as indicated by the availability field.

According to various exemplary embodiments, the UE may also further stop monitoring a PDCCH corresponding to a first CORESETPoolIndex of the multiple CORESETPoolIndexes, if a first channel occupancy time corresponding to the first CORESEPoolIndex is valid as indicated by the availability information and has a lower priority than a second COT corresponding to a second CORESETPoolIndex of the multiple CORESETPoolIndexes, wherein the second COT corresponding to the second CORESETPoolIndex is valid as indicated by the availability information, and the first CORESETPoolIndex has same CORESETPoolIndex group index as the second CORESETPoolIndex.

According to various exemplary embodiments, the availability information corresponding to a CORESETPoolIndex of the multiple CORESETPoolIndexes may indicate that there is no valid resource for a time period. If the time period from the availability information indicates 0, then it may signify that there is valid resource. The UE may also determine a remaining COT according to the PDCCH. The UE may monitor a PDCCH corresponding to a CORESETPoolIndex of the multiple CORESETPoolIndexes having the highest priority after the remaining COT if there is no valid resource indicated to the UE by the availability information.

The UE may then monitor a PDCCH corresponding to each CORESETPoolIndex of the multiple CORESETPoolIndexes after the remaining COT if there is no valid resource indicated to the UE by the availability information. Similarly, the UE may monitor a PDCCH corresponding to a CORESETPoolIndex of the multiple CORESETPoolIndexes as the PDCCH has been indicated as a valid resource by the availability information after the remaining COT. Similarly, the UE may monitor a PDCCH corresponding to a highest priority CORESETPooIndex of the multiple CORESETPoolIndexes which has been indicated as having a valid resource by the availability information.

Figure 8:
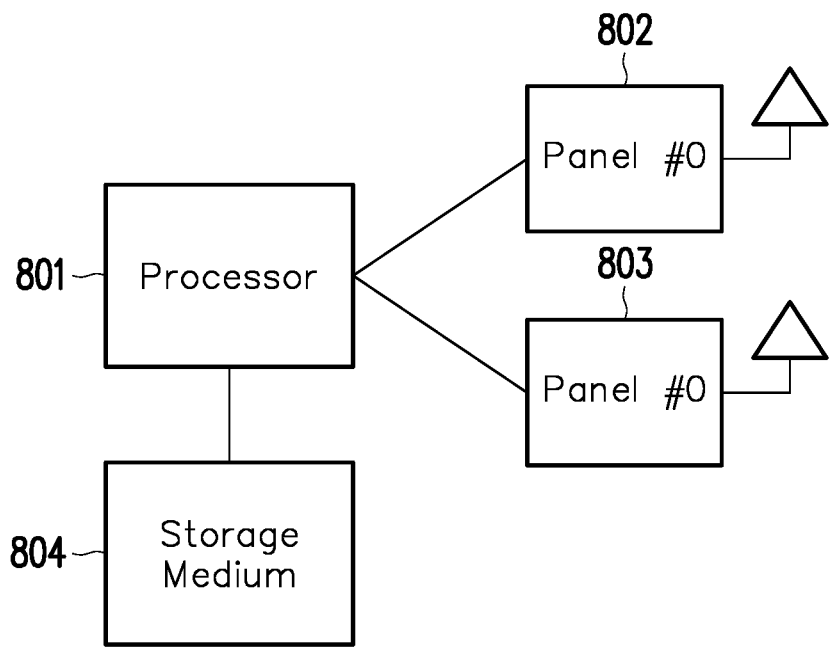
FIG. 8 illustrates the hardware block diagram of a UE an according to an exemplary embodiment of the disclosure.

FIG. 8 illustrates the hardware block diagram of a UE an according to an exemplary embodiment of the disclosure. The UE may include not limited to a hardware processor 801, one or multiple panels which may include a first panel 802, a second panel 803, and a non-transitory storage medium 804. The hardware processor 801 are electrically connected to the panels 802 803 and the non-transitory storage medium 803 and configured at least for implementing the method as described in FIG. 7 and subsequent exemplary embodiments.

Each of the panels 802 803 may include one or more transceivers which could be integrated or separate transmitters and receivers configured to transmit and receive signals respectively in the radio frequency or in the mmWave frequency. The hardware transceivers may also perform operations such as low noise amplifying, impedance matching, frequency mixing, up or down frequency conversion, filtering, amplifying, and so forth. The hardware transceivers may each include one or more analog-to-digital (A/D) and digital-to-analog (D/A) converters which are configured to convert from an analog signal format to a digital signal format during uplink signal processing and from a digital signal format to an analog signal format during downlink signal processing. The hardware transceivers may each further include an antenna array which may include one or multiple antennas to transmit and receive omni-directional antenna beams or directional antenna beams.

The hardware processor 801 is configured to process digital signals and to perform procedures of the proposed hierarchical registration method in accordance with the proposed exemplary embodiments of the disclosure. Also, the hardware processor 801 may access to the non-transitory storage medium 803 which stores programming codes, codebook configurations, buffered data, and record configurations assigned by the hardware processor 801. The hardware processor 801 could be implemented by using programmable units such as a micro-processor, a micro-controller, a DSP chips, FPGA, etc. The functions of the hardware processor 801 may also be implemented with separate electronic devices or ICs. It should be noted that the functions of hardware processor 801 may be implemented with either hardware or software.

Figure 9:
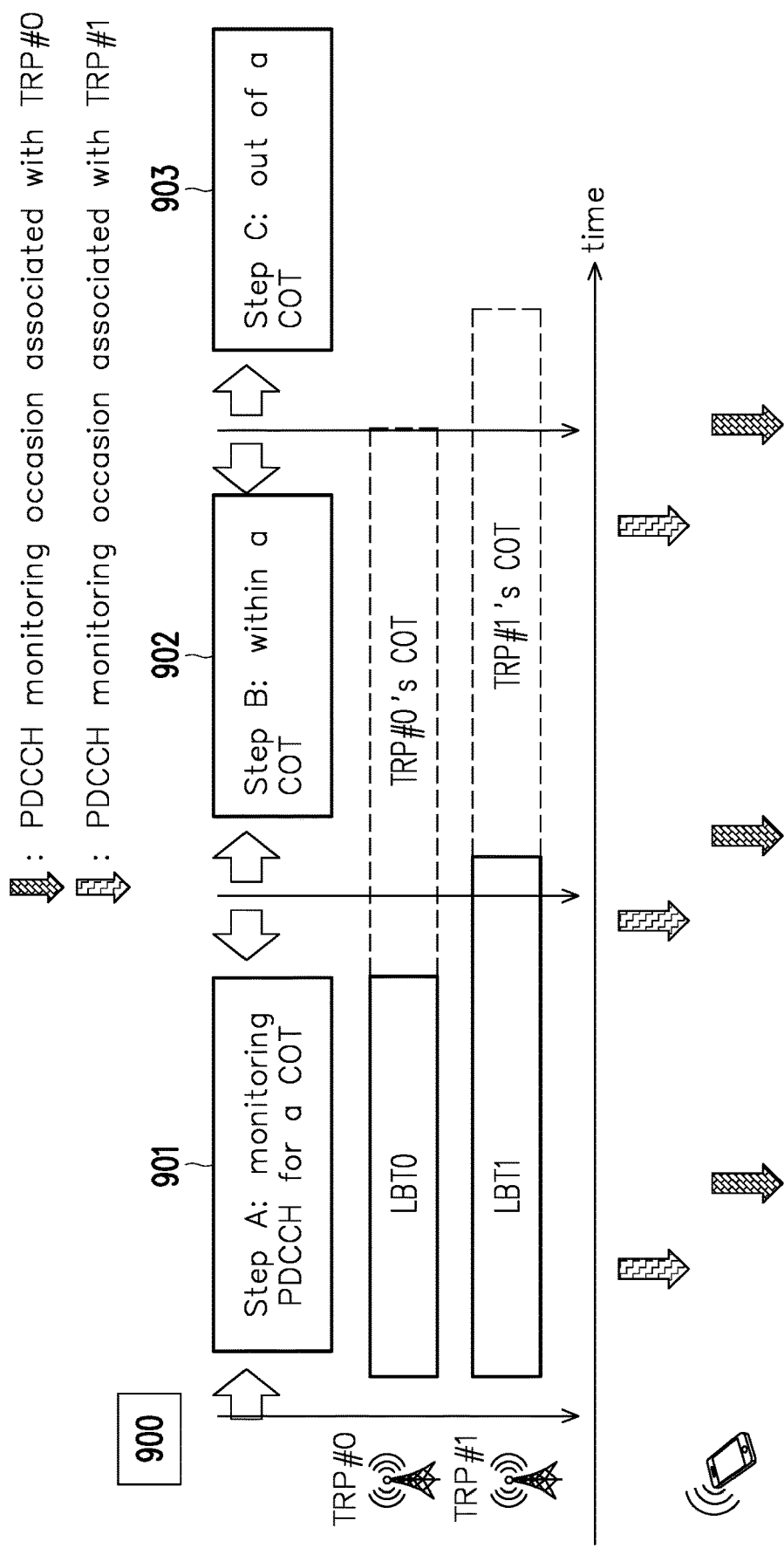
FIG. 9 illustrates a UE having one panel receiving scheduling from a TRP an according to an exemplary embodiment of the disclosure.

In order to implement the above described concepts, the disclosure provides many exemplary embodiments. First, the disclosure provides various exemplary embodiments of a UE scheduled by one TRP at a time. A UE could be scheduled by one TRP at a time if the UE has only one physical panel or only one physical panel active. FIG. 9 illustrates a UE having one panel receiving scheduling from a TRP. Assuming that the UE could be configured with 2 TRPs for wireless communication in an unlicensed band but the UE is only be able to be scheduled by one TRP at a time, the UE would first receive a radio resource control (RRC) configuration or re-configuration S900 which includes TRP #0 and TRP #1 in its bits. FIG. 9 shows the TRP #0 has a LBT time slot, LBT0, followed by a COT time slot, TRP #0's COT whereas TRP #1 has a LBT time slot, LBT1, following by a COT time slot TRP #1's COT. The UE may monitor one or both of the PDCCH associated with TRP #0 or TRP #1. The time slots of one TRP could be longer than the time slots of another. The UE monitoring the PDCCH may be according to a search space set where the group index of the search space set is 0 or 1 or without group index. After receiving RRC (re)configuration, in step A S901, the UE may monitor a PDCCH from one or more of the TRPs for a COT. In step B S902, the UE operate within a COT of a TRP. In step C S903, the UE would eventually step out of the COT.

Figure 10:
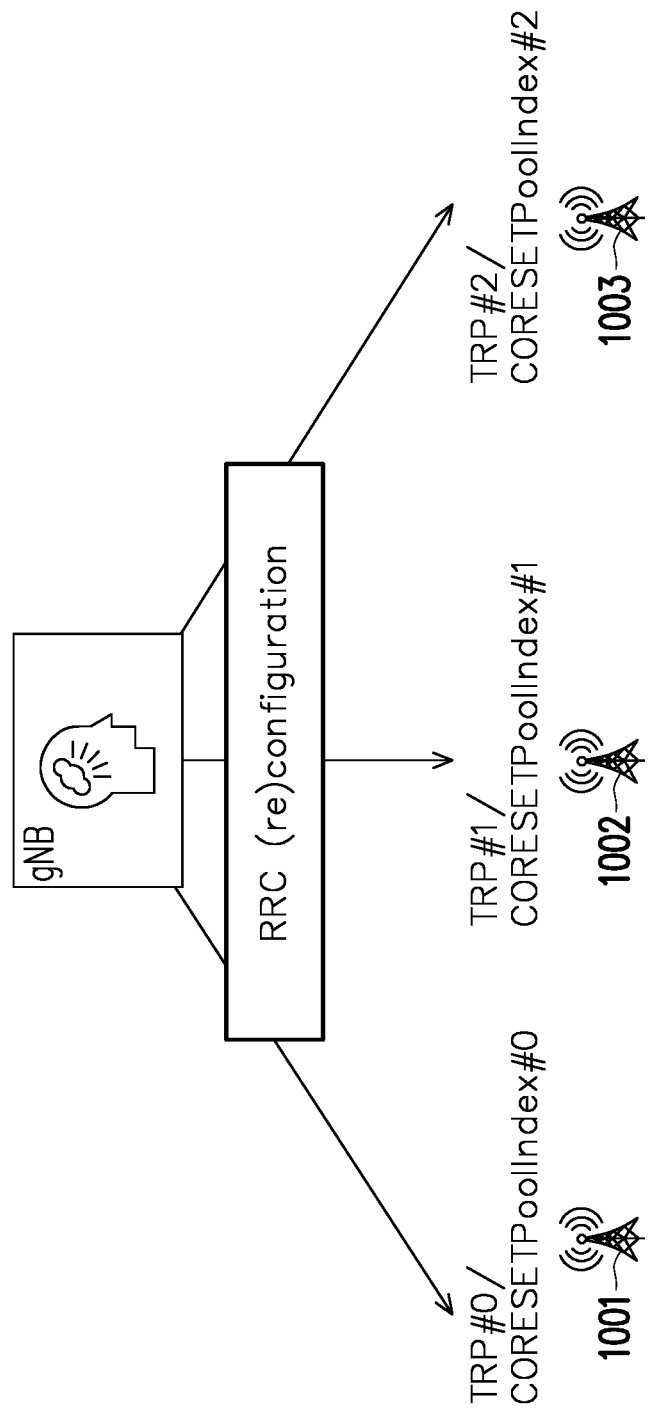
FIG. 10 illustrates a concept of a priority of a TRP according to an exemplary embodiment of the disclosure.

The purpose of the step A S901 could be to determine a TRP priority in order to receive scheduling from the network. FIG. 10 illustrates a concept of a priority of a TRP. A UE could be configured with multiple TRPs by a gNB by specifying multiple CORESETPoolIndexes for the UE. Assuming that there are three TRPs, TRP #0, TRP #1, and TRP #2 as shown in FIG. 10, the gNB may specify CORE-SETPoolIndex #0 which corresponds to TRP #0 for the UE, the gNB may specify CORESETPoolIndex #1 which corresponds to TRP #1 for the UE, and the gNB may specify CORESETPoolIndex #2 which corresponds to TRP #2 for the UE. However, in this exemplary embodiment, the TRPs is associated with a priority. The priority could be associated with the index of the TRP. For example, the index of TRP #0 is 0, the index of TRP #1 is 1, and the index of TRP #2 is 2. Assuming that a lesser number has a higher priority than a greater number, and thus the order of priority in this example is TRP #0>TRP #1>TRP 2.

Figure 11:
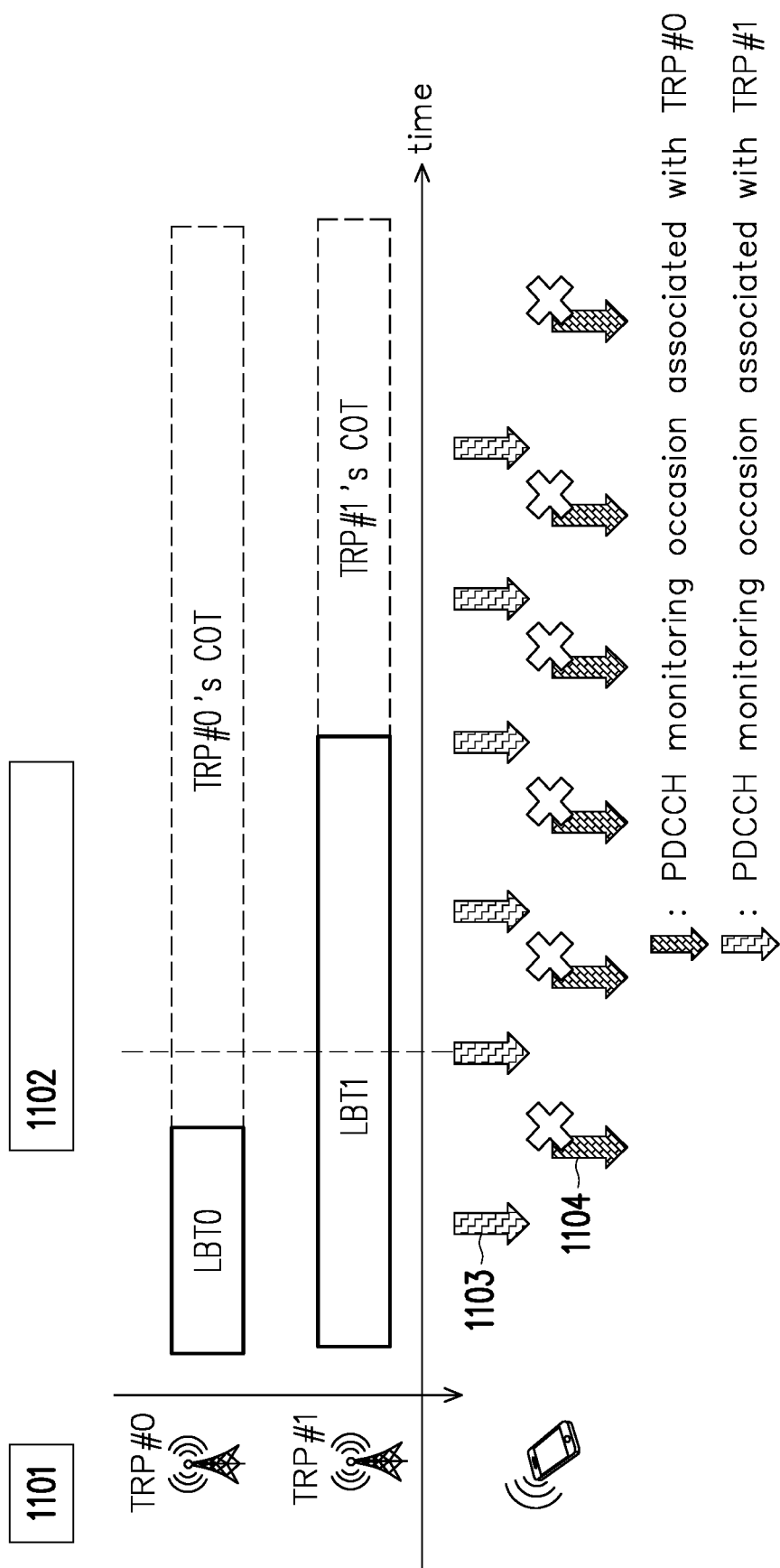
FIG. 11 illustrates PDCCH monitoring by a UE for a COT according to an exemplary embodiment of the disclosure.

Since a TRP is associated with a priority, a UE may determine which PDCCH of a TRP to monitor based on its priority. After a UE receives multiple TRP RRC (re)configurations (S1101), in this exemplary embodiment, the UE may only monitor the PDCCH associated with the TRP having the highest priority. The PDCCH may be associated with a search space set with group index 0 or without any group index. FIG. 11 illustrates PDCCH monitoring by a UE for a COT in a scenario where the priority of TRP #0 is greater than the priority of TRP #1. Assuming that TRP #0 is associated with a first beam and TRP #1 is associated with a second beam. For TRP #0, as shown in FIG. 11, LBT0 is followed by TRP #0's COT which are covered by the first beam, and LBT1 is followed by TRP #1's COT which are covered by the second beam. Since TRP #0 has a higher priority than TRP #1, the UE may only monitor the PDCCH associated with TRP #0 (S1103) but not the PDCCH associated with TRP #1 (S1104). Thus, the UE would detect the PDCCH associated with TRP #0 (S1102) during LBT1, and the UE would transmit and/or receive data during TRP #0's COT.

Figure 12:
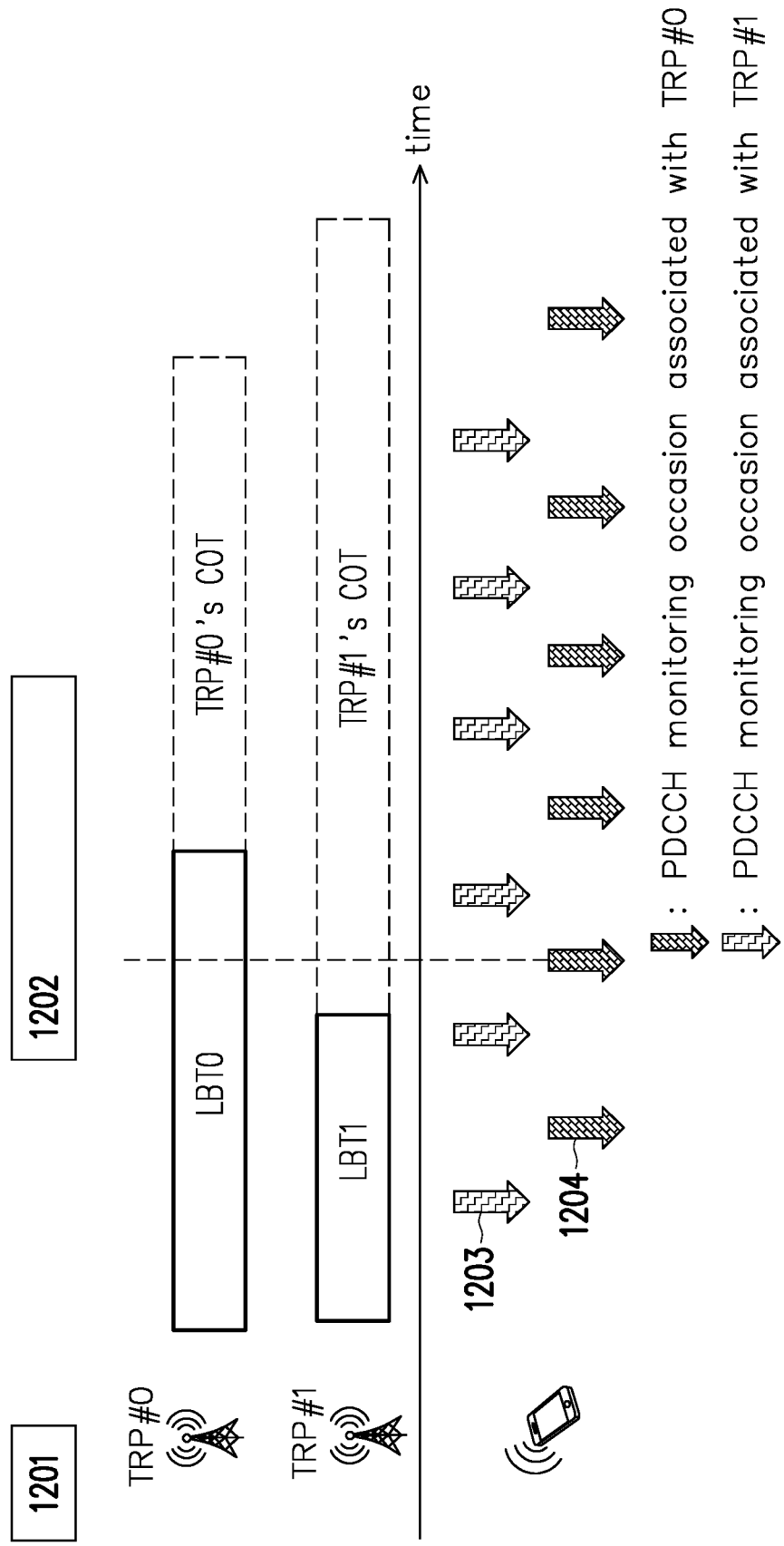
FIG. 12 illustrates PDCCH monitoring by a UE for a COT according to another exemplary embodiment of the disclosure.

According to an alternative exemplary embodiment, a UE may determine to monitor the PDCCH of a TRP having a lesser priority but would prioritize which TRP to receive scheduling based on the priority of the TRP. FIG. 12 shows such exemplary embodiment. After a UE receives multiple TRP RRC (re)configurations (S1201), in this exemplary embodiment, the UE would monitor the PDCCH associated with both the TRP having the higher priority (or in this example the highest priority) as well as the TRP having a lesser priority. The PDCCH may be associated with a search space set with group index 0 or without any group index. In FIG. 12, it is assumed that the priority of TRP #0 is greater than the priority of TRP #1, and TRP #0 is associated with a first beam while TRP #1 is associated with a second beam. For TRP #0, LBT0 is followed by TRP #0's COT which are covered by the first beam, and LBT1 is followed by TRP #1's COT which are covered by the second beam. Even though TRP #0 has a higher priority than TRP #1, the UE may monitor both the PDCCH associated with TRP #0 (S1203) as well as the PDCCH associated with TRP #1 (S1204). However, the UE would detect the PDCCH associated with TRP #1 (S1202) during LBT0 to receive scheduling through the TRP #1 assuming that both TRP #0 and TRP #1 are available.

Figure 13:
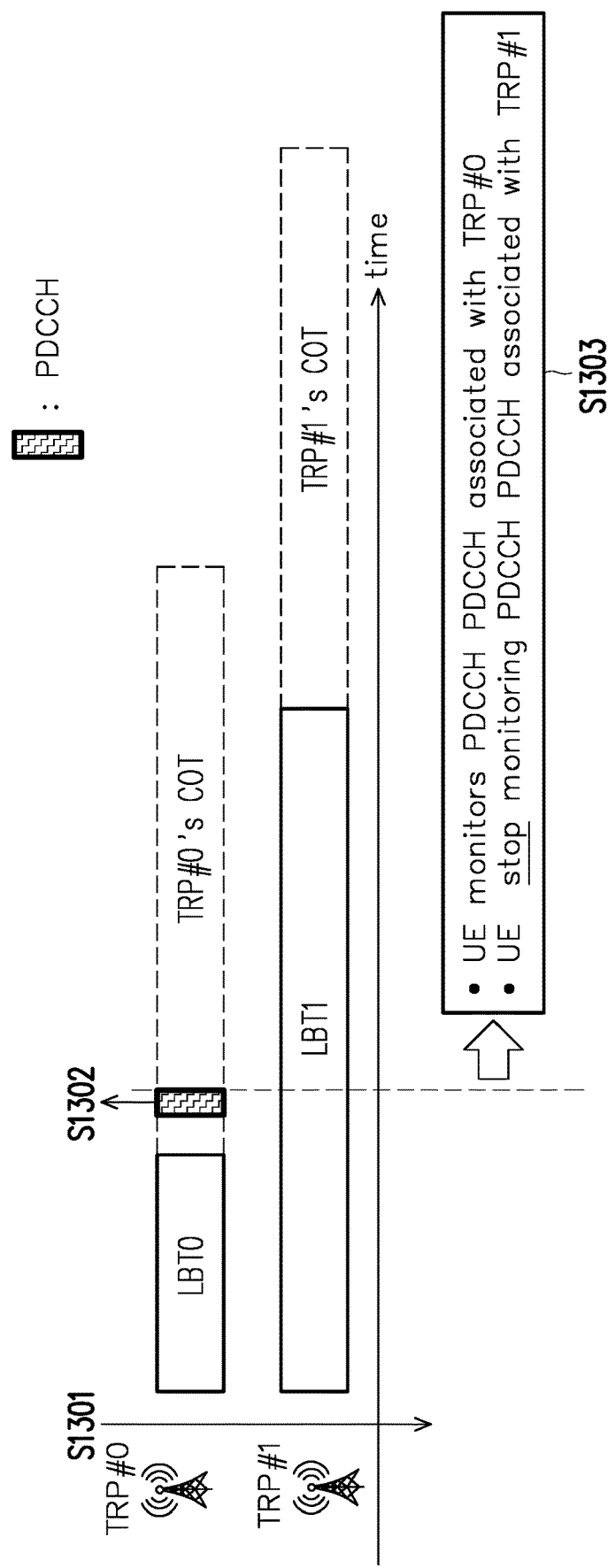
FIG. 13 illustrates a variation of PDCCH monitoring by a UE for a COT according to an exemplary embodiment of the disclosure.

Referring back to FIG. 9, after the UE monitors a PDCCH from one or more TRPs for a COT in step A S901, in step B S902, the UE would operate within a COT of a TRP. FIG. 13 illustrates an exemplary embodiment of a UE operating within the COT of a TRP having a higher (or highest priority). Assuming that a UE has received multiple TRP RRC (re)configurations as in the exemplary embodiment of FIG. 11 and FIG. 12, the UE would monitor the PDCCH associated with TRP #0 but would stop monitoring the PDCCH associated with TRP #1 (S1302) as soon as the UE start operating within the COT of TRP #0.

Figure 14:
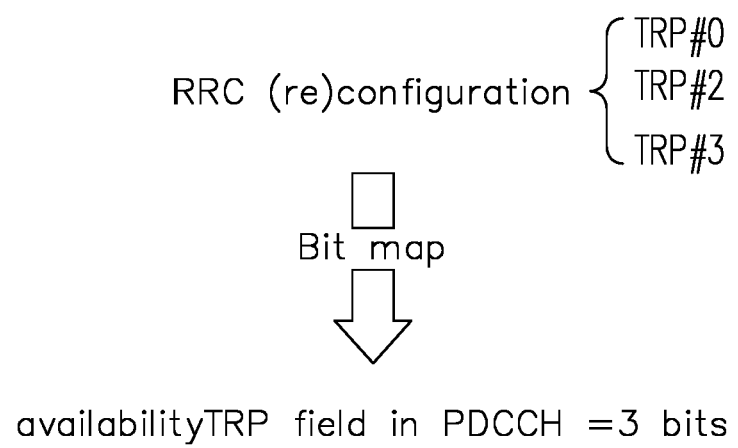
FIG. 14 illustrates the bitmap of the availabilityTRP parameter according to an exemplary embodiment of the disclosure.

In order for a UE to determine which TRP is available for receiving data scheduling, the UE could be provided with the availabilityTRP parameter which is located in a PDCCH such as a group common (GC) PDCCH (GC-PDCCH) and the length of bits of the availabilityTRP could be directly related to the number of TRPs. In other words, availabilityTRP may functions as a bit map. In FIG. 14, a set of M-TRP as three TRPs, and thus a first bit of availabilityTRP is a binary number which signifies whether TRP #0 is available. Similarly, a second bit of availabilityTRP signifies the availability of TRP #1 and a third bit of availabilityTRP signifies the availability of TRP #2. As an example, the binary '1' could indicate that a TRP is available for scheduling and the binary '0' could indicate that a TRP is unavailable for scheduling, but the opposite may also be true as the implementation could be arbitrary.

Figure 15:
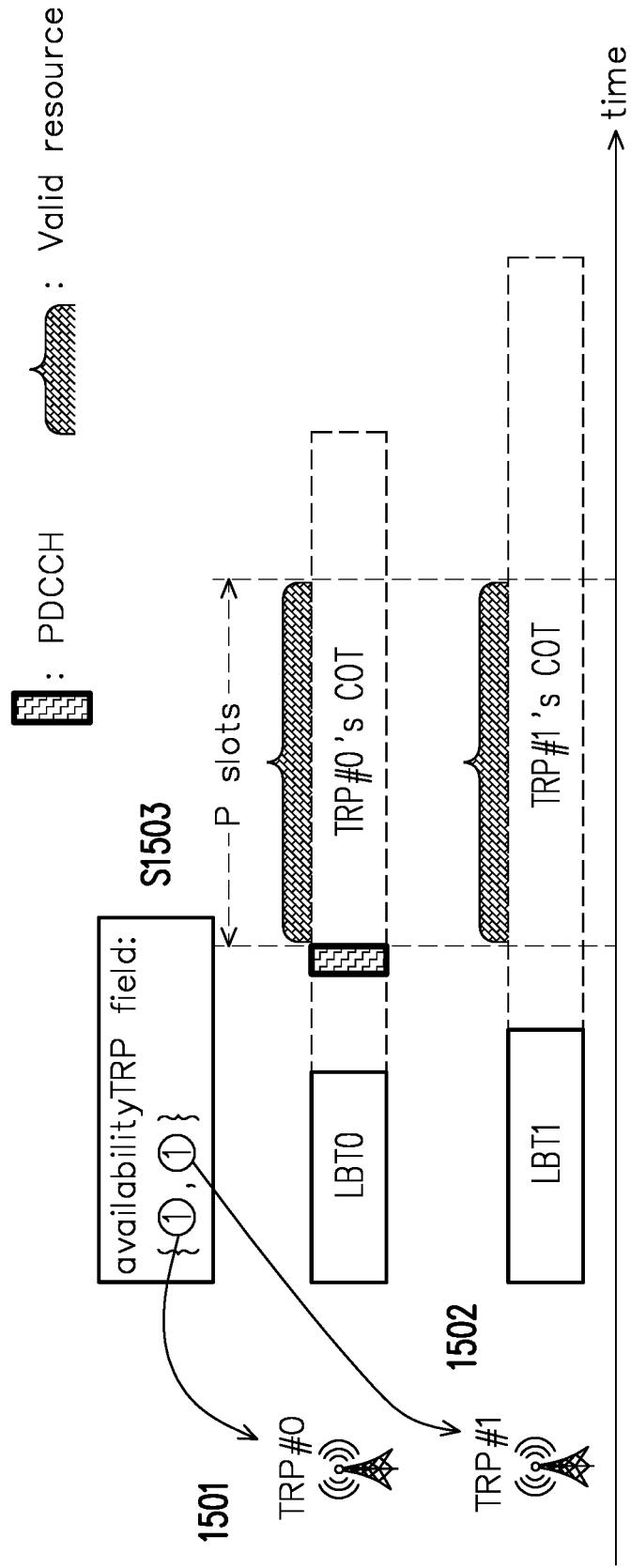
FIG. 15 illustrates scheduling availability based on the availabilityTRP parameter according to an exemplary embodiment of the disclosure.

FIG. 15 shows an exemplary embodiment of utilizing the availabilityTRP parameter. In response to a UE receiving and successfully decoding the PDCCH associated with TRP #0 (S1503), from the PDCCH, the UE may obtain the availabilityTRP parameter in which a first bit 1501 indicates a binary '1' and a second bit 1520 also indicates a binary '1'. This means that both TRP #0 and TRP #1 are available for scheduling a UE. Thus, a time duration starting from a symbol which is after a last symbol of the PDCCH could be treated as a valid resource. This time during is the P slots as shown in FIG. 15 and could be indicated in the unit of milliseconds (ms).

Figure 16:
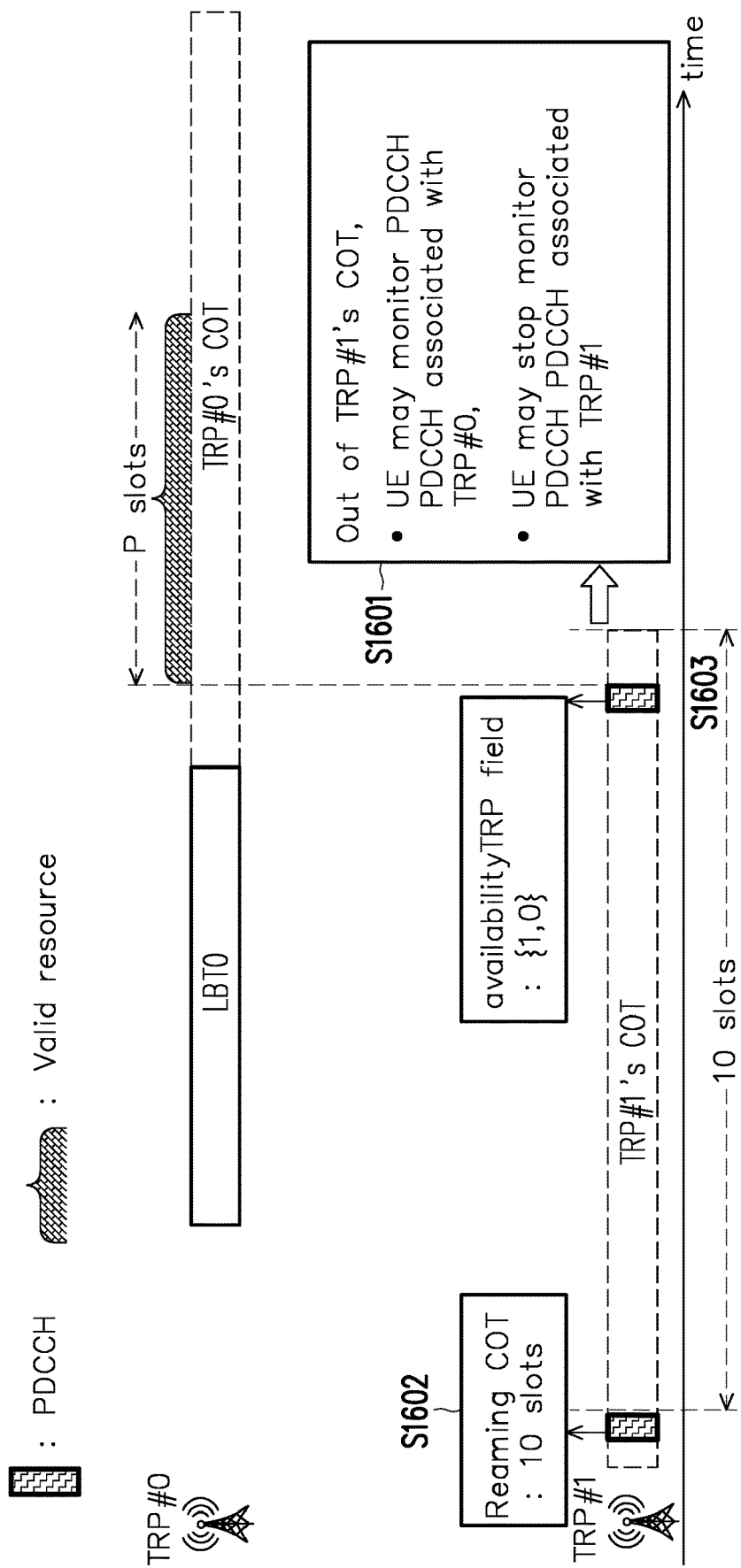
FIG. 16 illustrates changing the serving COT based on the availabilityTRP parameter according to an exemplary embodiment of the disclosure.

FIG. 16 shows another exemplary embodiment of utilizing the availabilityTRP parameter but involves COT switching. In this exemplary embodiment, the UE has been receiving scheduling from TRP #1's COT and receives a first PDCCH (S1602) from TRP #1. From the first PDCCH (S1602), the TRP #1's COT is available for scheduling for N (e.g. 10) slots. From TRP #1's COT, the UE subsequently receives a second PDCCH (S1603) which contains availabilityTRP The first bit of availabilityTRP is associated with TRP #0 and indicates a binary '1' and a second bit of availabilityTRP is associated with TRP #1 indicates a binary '0'. Therefore, in response to receiving the availabilityTRP parameter, the UE would monitor the PDCCH associated with TRP #0 and the UE would stop monitoring the PDCCH associated with TRP #1 (S1601) after a last symbol of a remaining COT of TRP #1. This would mean that after a last symbol of a remaining COT of TRP #1, the UE may monitor the PDCCH associated with the TRP #0 in TRP #0's COT as shown in the P slots of FIG. 16. Also, the UE would not monitor the PDCCH associated with TRPs that are not indicated as valid by the availabilityTRP bitmap. It is worth noting that the PDCCH of TRP #0 or TRP #1 could be associated with a search space set group index 0, could be associated with a search space group index 1, could be associated with a search space set without a group index. The group index of a search space set for the PDCCH could be indicated by a gNB.

Figure 17:
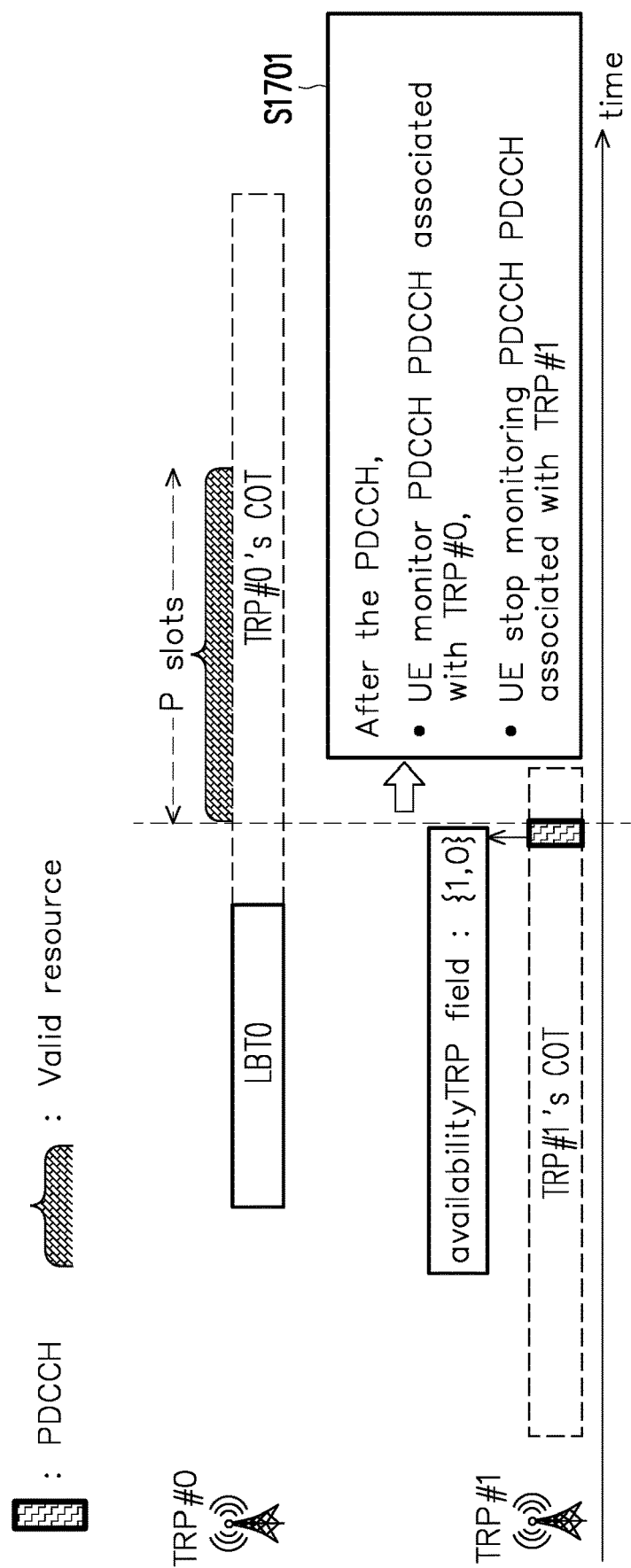
FIG. 17 illustrates a first variation of the embodiment of FIG. 16 according to an exemplary embodiment of the disclosure.

FIG. 17 shows a first variation of the embodiment of FIG. 16. This exemplary embodiment is similar to FIG. 16. From TRP #1's COT, the UE receives a PDCCH which contains availabilityTRP The first bit of availabilityTRP is associated with TRP #0 and indicates a binary '1' and a second bit of availabilityTRP is associated with TRP #1 indicates a binary '0'. This means that TRP #1 is no longer available for scheduling, and the service of the UE is to be switched to TRP #0. Therefore, in response to receiving the availabilityTRP parameter, the UE would monitor the PDCCH associated with TRP #0 and the UE would stop monitoring the PDCCH associated with TRP #1 (S1701). This would mean after receiving the information as indicated in the availabilityTRP, the service of the UE is switched to TRP #0 after a last symbol of the PDCCH as the UE may monitor the PDCCH associated with the TRP #0 in TRP #0's COT as shown in the P slots of FIG. 16. Also, the UE would not monitor the PDCCH associated with TRPs that are not indicated as valid by the availabilityTRP bitmap.

Figure 18:
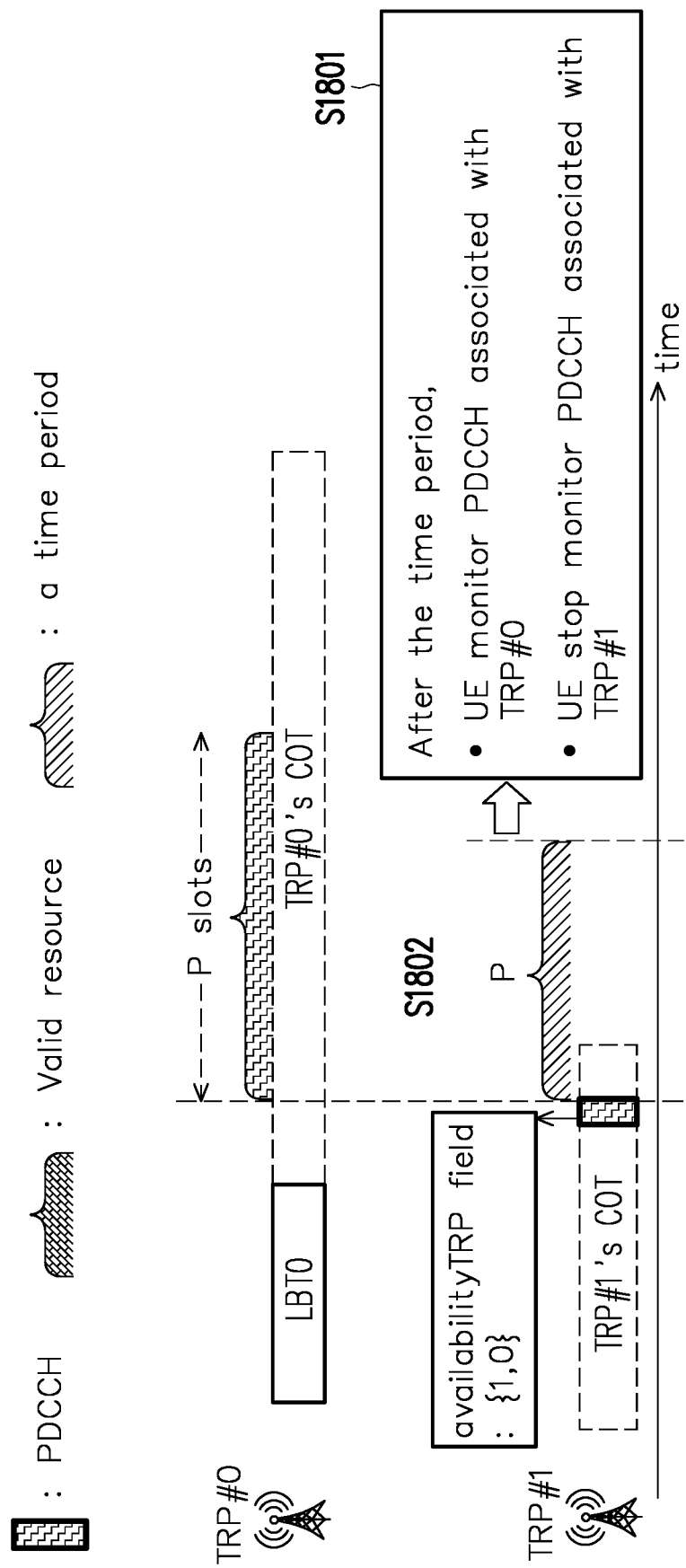
FIG. 18 illustrates a second variation of the embodiment of FIG. 16 according to an exemplary embodiment of the disclosure.

FIG. 18 shows a second variation of the embodiment of FIG. 16. This exemplary embodiment is similar to FIG. 16. From TRP #1's COT, the UE receives a PDCCH which contains availability TRE. The first bit of availabilityTRP is associated with TRP #0 and indicates a binary '1' and a second bit of availabilityTRP is associated with TRP #1 indicates a binary '0'. This means that TRP #1 is no longer available for scheduling, and the service of the UE is to be switched to TRP #0. Therefore, in response to receiving the availabilityTRP parameter, the UE would monitor the PDCCH associated with TRP #0 and the UE would stop monitoring the PDCCH associated with TRP #1 (S1801). This would mean after receiving the information as indicated in the availability TRP, the service of the UE is switched to TRP #0 after a time period (P) (S1802) of a last symbol of the PDCCH as the UE may monitor the PDCCH associated with the TRP #0 in TRP #0's COT as shown in the P slots of FIG. 16. Also, the UE would not monitor the PDCCH associated with TRPs that are not indicated as valid by the availabilityTRP bitmap. The time period (P) could be indicated by the gNB.

Figure 19:
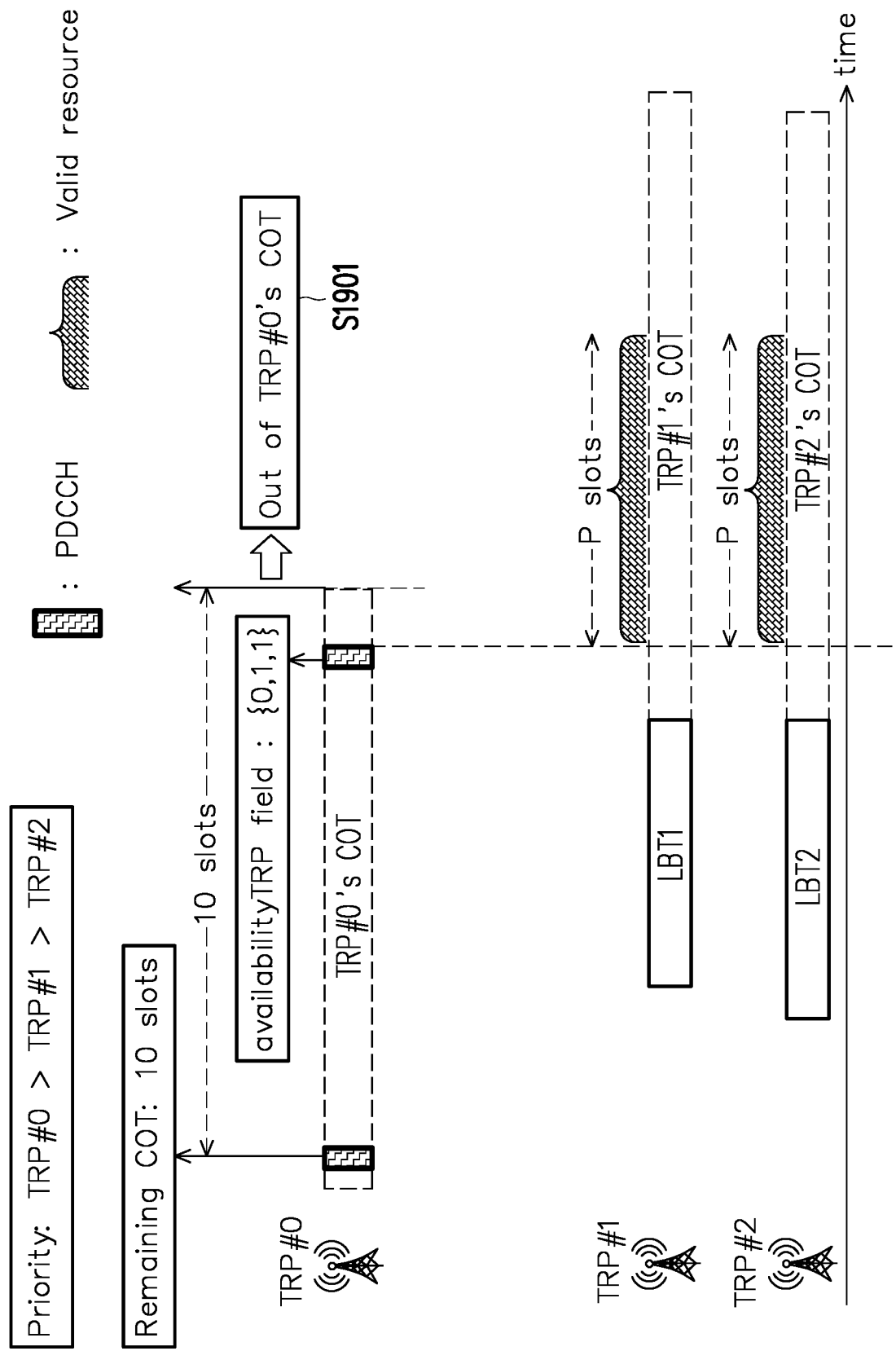
FIG. 19 illustrates changing the serving COT based on the highest priority and the availabilityTRP parameter according to an exemplary embodiment of the disclosure.

FIG. 19 illustrates changing the serving COT based on the highest priority and the availabilityTRP parameter according to an exemplary embodiment of the disclosure. As shown in FIG. 16, the UE receives from TRP #0's COT from a first PDCCH which indicates that the COT is available for N (e.g. 10) slots. From within the 10 slots, the UE subsequently receives a second PDCCH which contains availabilityTRP. The first bit of availabilityTRP is associated with TRP #0 and indicates a binary '0' and a second bit of availabilityTRP is associated with TRP #1 indicates a binary '1' and a third bit of availabilityTRP is associated with TRP #2 indicates a binary '1'. Therefore, in response to receiving the availabilityTRP parameter, the UE would immediately stop monitoring the PDCCH of the TRP(s) such as TRP #0 which does not have a valid resource after a last symbol of the COT of the first TRP (S1901). This would mean that after the end of the 10 time slots, the UE may switch to monitoring the PDCCH associated with the TRP #1 and TRP #2. The P slots of TRP #1 and TRP #2 would then be available for scheduling.

However, for an exemplary embodiment, the scheduling of the UE could be based on the priority of the TRP. Thus, for the embodiment of FIG. 19, the priority is assumed to be based on the numbering of the TRP and thus TRP #1 has a higher priority than TRP #2. This means that the UE would monitor the PDCCH of TRP #1 instead of the PDCCH of TRP #2. It is worth noting that the PDCCH of TRP #0 or TRP #1 could be associated with a search space set group index 0, could be associated with a search space group index 1, could be associated with a search space set without a group index. The group index of a search space set for the PDCCH could be indicated by a gNB. Also, the N time slots could be adjusted based on the information received from the first PDCCH from TRP #0.

Figure 20:
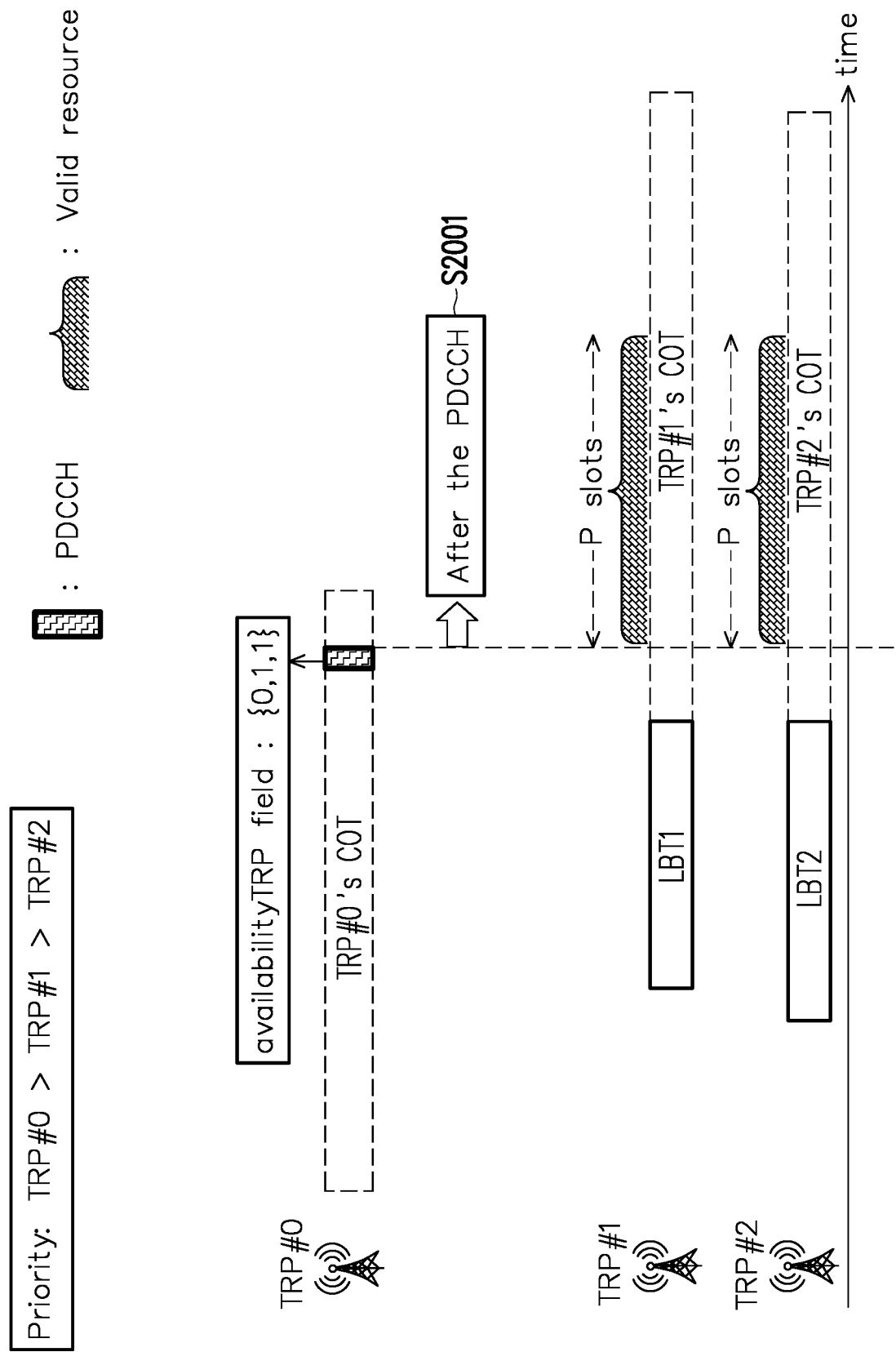
FIG. 20 illustrates a first variation of the embodiment of FIG. 19 according to an exemplary embodiment of the disclosure.

FIG. 20 shows a first variation of the embodiment of FIG. 19. This exemplary embodiment is similar to FIG. 19. From TRP #1's COT, the UE receives a PDCCH which contains availabilityTRP The first bit of availabilityTRP is associated with TRP #0 and indicates a binary '0' and a second bit of availabilityTRP is associated with TRP #1 indicates a binary '1' and a third bit of availabilityTRP is associated with TRP #2 indicates a binary '1'. This means that TRP #0 is no longer available for scheduling, and the service of the UE is to be switched to TRP #1 since the priority of TRP #1 is assumed to be greater than the priority of TRP #2. Therefore, in response to receiving the availabilityTRP parameter, the UE would monitor the PDCCH associated with TRP #1 and the UE would stop monitoring the PDCCH associated with TRP #0 (S2001). This would mean after receiving the information as indicated in the availabilityTRP, the service of the UE is switched to TRP #1 after a last symbol of the PDCCH as the UE may monitor the PDCCH associated with the TRP #0 in TRP #0's COT as shown in the P slots of FIG. 20. Also, the UE would not monitor the PDCCH associated with TRPs that are not indicated by the availabilityTRP bitmap.

Figure 21:
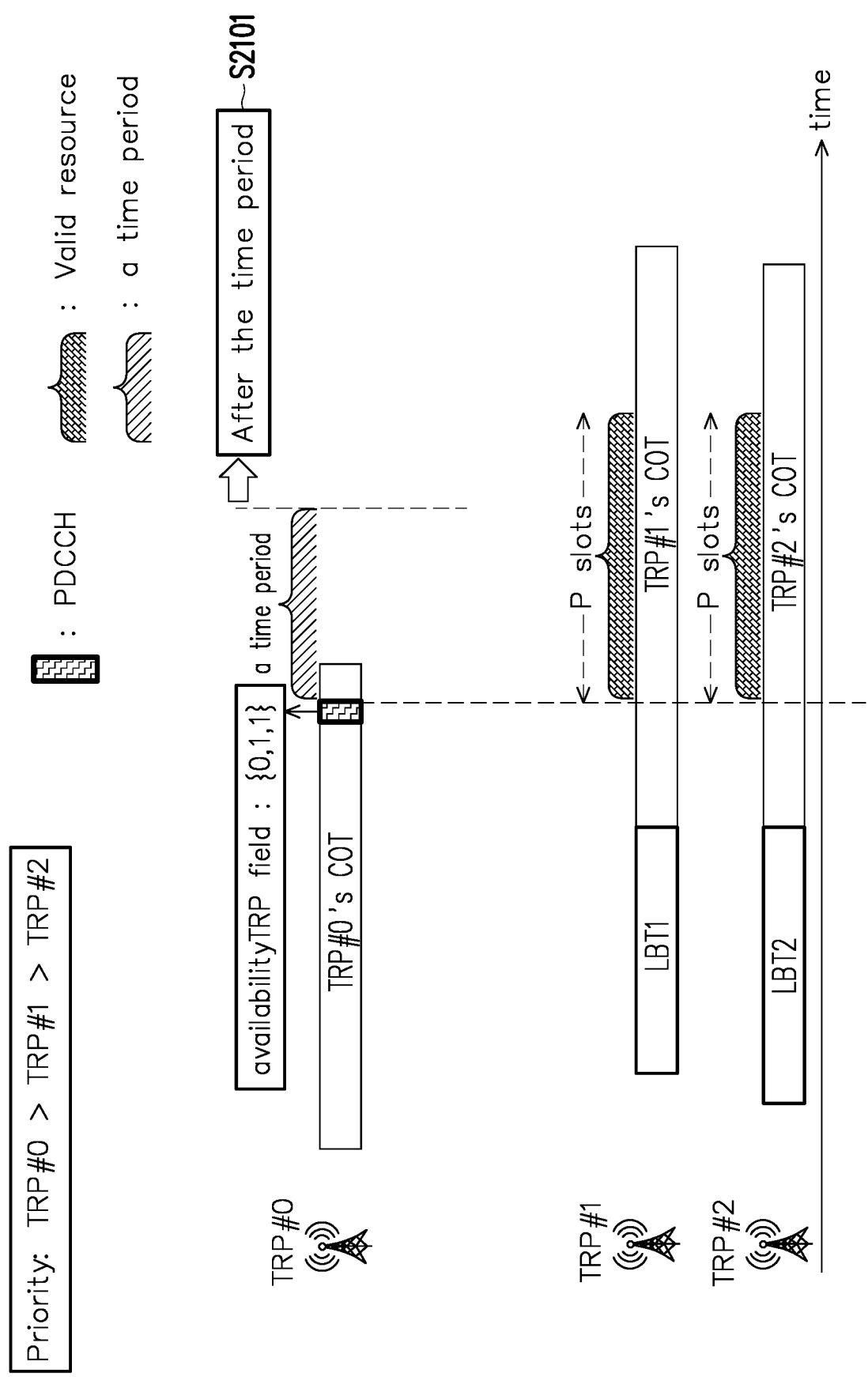
FIG. 21 illustrates a second variation of the embodiment of FIG. 19 according to an exemplary embodiment of the disclosure.

FIG. 21 illustrates a second variation of the embodiment of FIG. 19 according to an exemplary embodiment of the disclosure. This exemplary embodiment is similar to FIG. 19. From TRP #1's COT, the UE receives a PDCCH which contains availabilityTRP. The first bit of availabilityTRP is associated with TRP #0 and indicates a binary '0' and a second bit of availabilityTRP is associated with TRP #1 indicates a binary '1' and a third bit of availabilityTRP is associated with TRP #2 indicates a binary '1'. This means that TRP #0 is no longer available for scheduling, and the service of the UE is to be switched to TRP #1 since the priority of TRP #1 is assumed to be greater than the priority of TRP #2. Therefore, in response to receiving the availabilityTRP parameter, the UE would monitor the PDCCH associated with TRP #1 and the UE would stop monitoring the PDCCH associated with TRP #0 (S2001). This would mean after receiving the information as indicated in the availability TRP, the service of the UE is switched to TRP #1 after a last symbol of the PDCCH as the UE may monitor the PDCCH associated with the TRP #0 in TRP #0's COT as shown in the P slots of FIG. 20. Also, the UE would not monitor the PDCCH associated with TRPs that are not indicated by the availabilityTRP bitmap.

Figure 22:
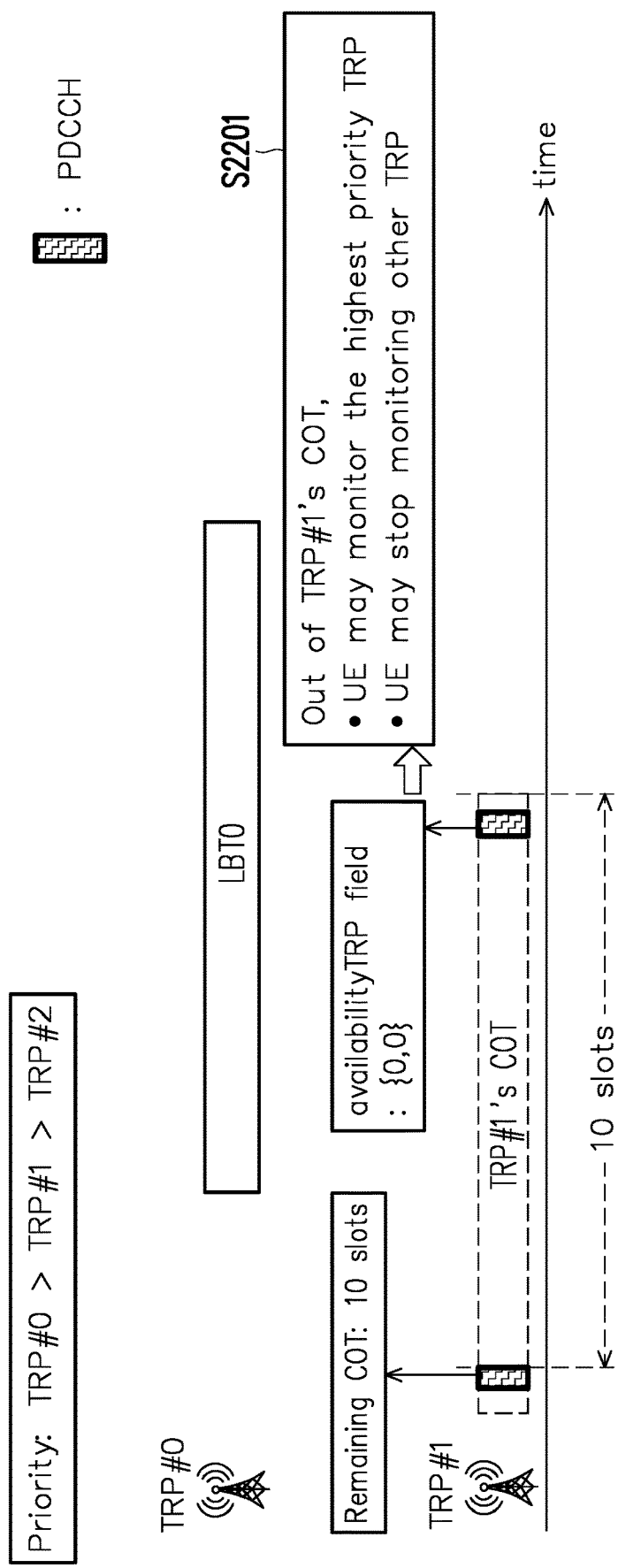
FIG. 22 illustrates the scheduling of the UE when there is no valid resource according to an exemplary embodiment of the disclosure.

A UE could be provided with a remaining COT of a TRP from a PDCCH associated with the TRP. As shown in FIG. 22, after a UE receives from TRP #1 the first PDCCH which provides a COT of N (e.g. 10) slots, but the second PDCCH contains the availabilityTRP parameter indicating binary '0' for both TRP #0 and TRP #1. Under such circumstance, after the N slots have expired, the UE could be pre-programmed to monitor the PDCCH associated with the highest TRP, such as TRP #0. Also, the UE may stop monitoring the PDCCH associated with other TRP, such as TRP #1 in this exemplary embodiment.

Figure 23:
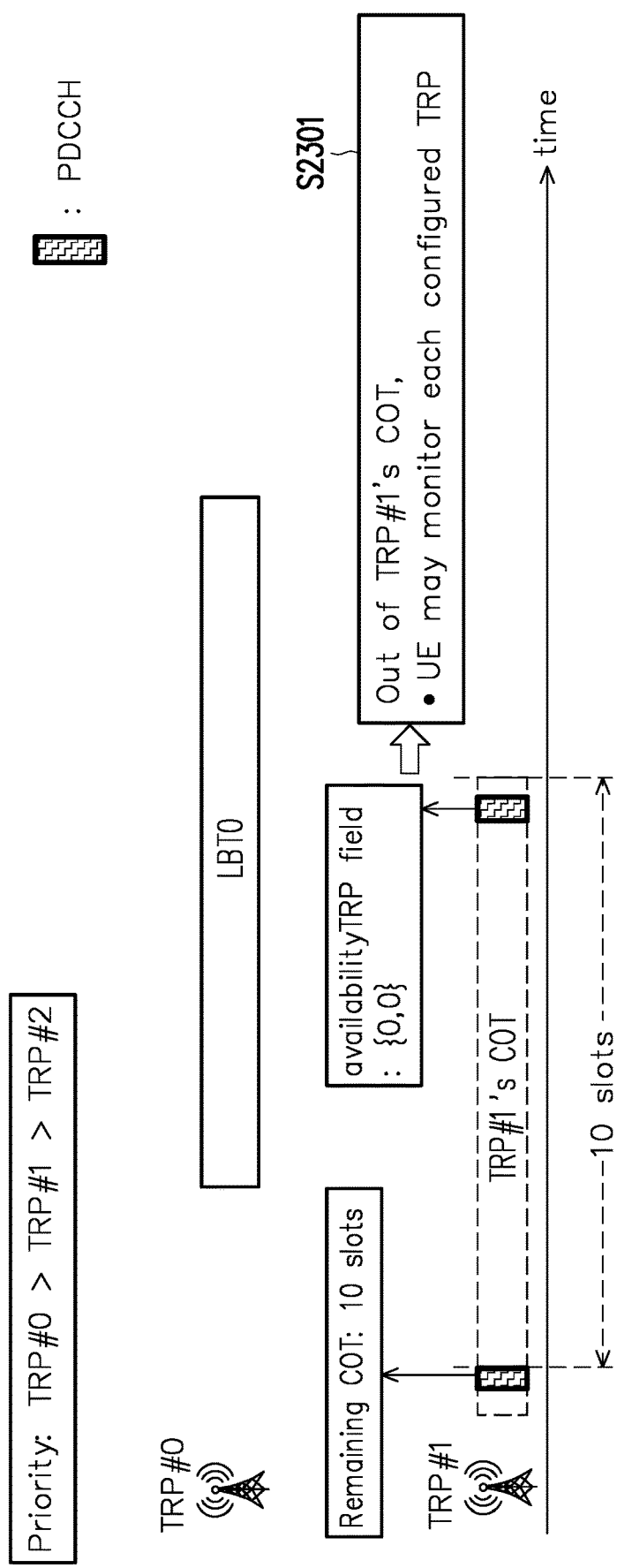
FIG. 23 illustrates an alternative embodiment of the scheduling of the UE when there is no valid resource.

FIG. 23 shows an alternative embodiment of the scheduling of the UE when there is no valid resource. Similar to the embodiment of FIG. 22, after the N slots have expired, the UE could be by default monitor the PDCCH(s) associated with each of the configured TRP including TRP #0 and TRP1 in this exemplary embodiment after a last symbol of the remaining COT has expired if there is no valid resource have been indicated to the UE.

Figure 24:
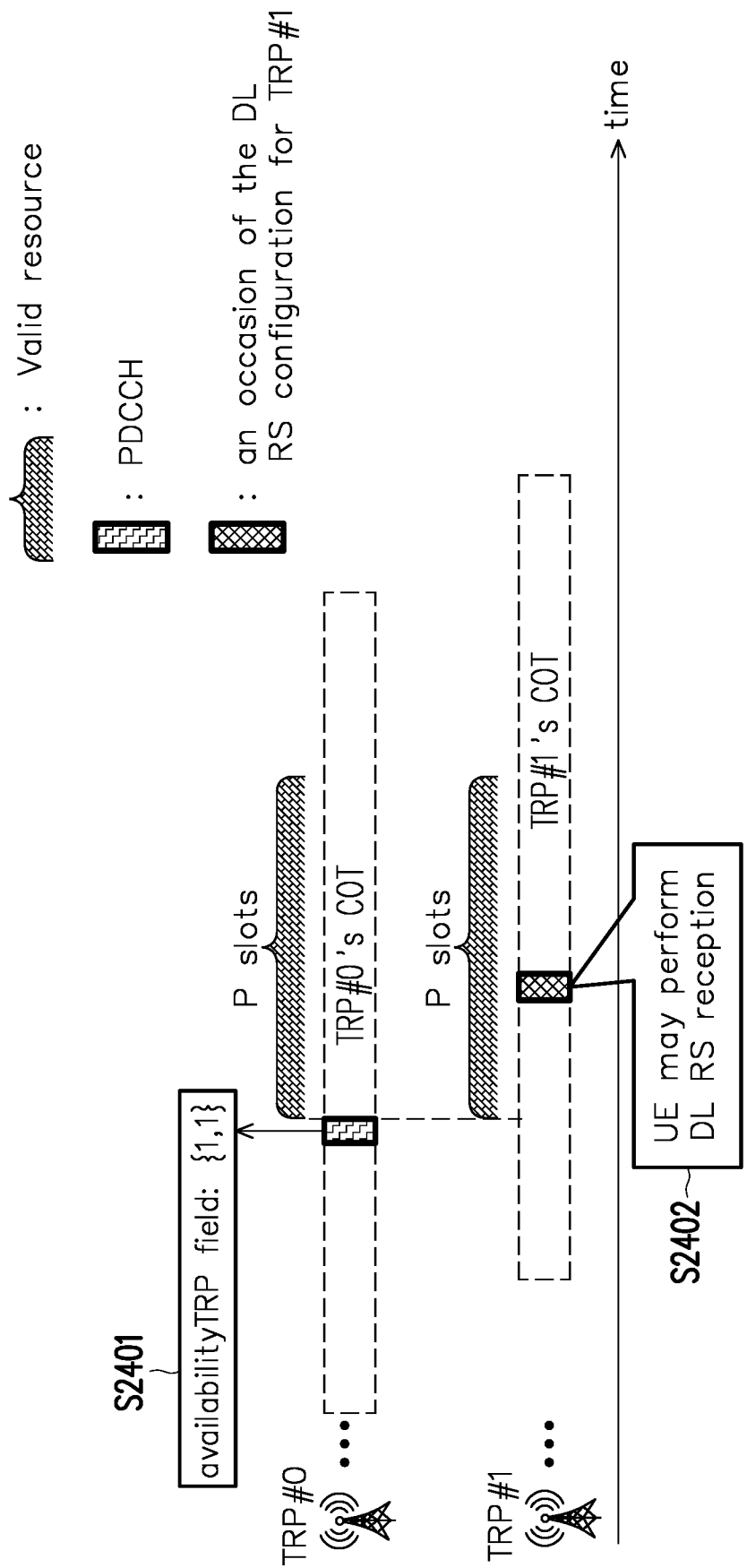
FIG. 24 illustrates DL RS reception according to an exemplary embodiment of the disclosure.

FIG. 24 is an exemplary embodiment related to DL RS reception by a UE. In this exemplary embodiment, the UE has received from a PDCCH (e.g. GC-PDCCH) from TRP #0's COT the availabilityTRP parameter indicating {1, 1} which means the binary value is '1' for both TRP #0 and TRP #1. Thus, since an occasion of DL RS configuration for TRP #1 is within the valid resource as indicated by the availabilityTRP parameter, then the UE may perform DL RS reception for the TRP #1 (S2402).

Figure 25:
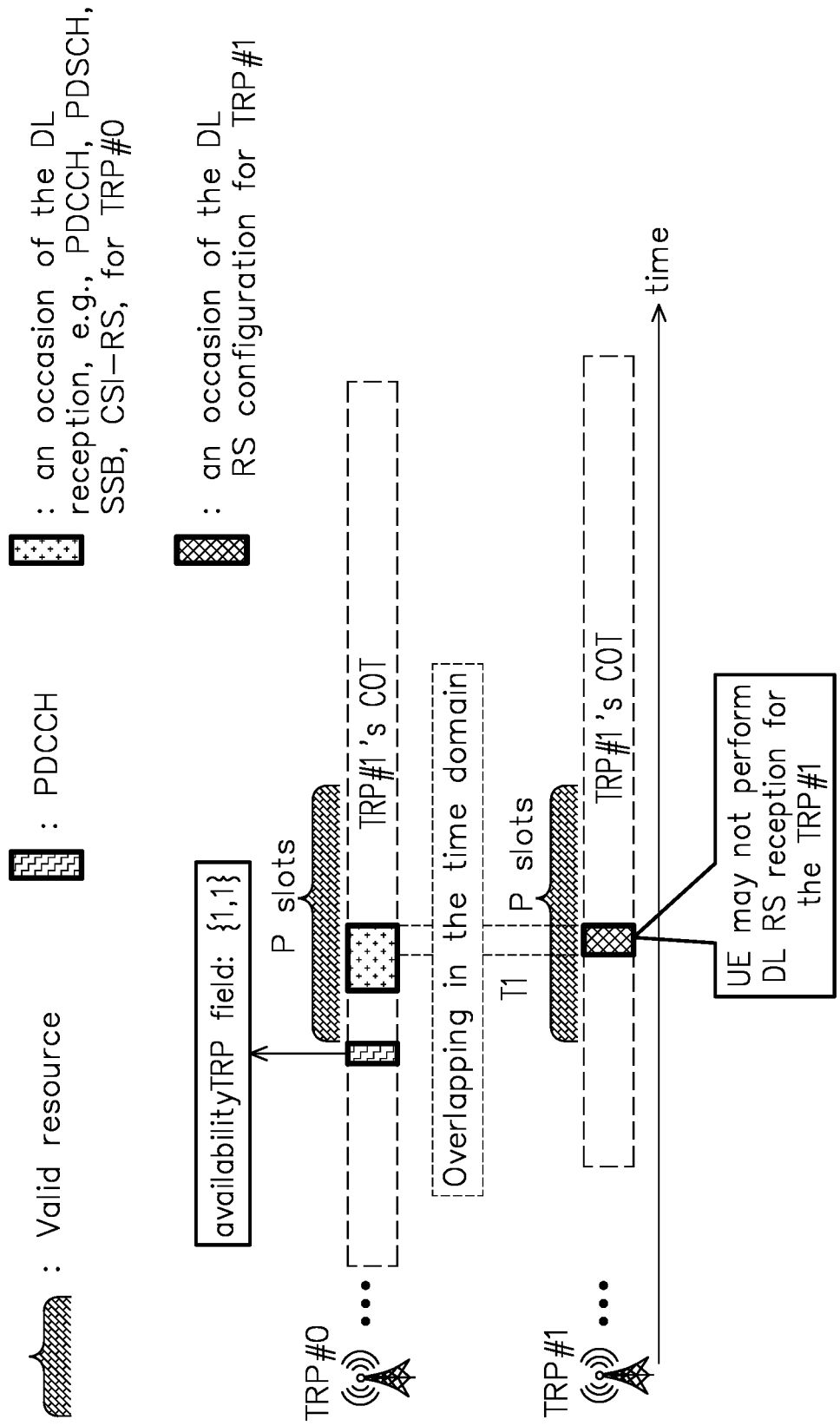
FIG. 25 illustrates an occasion of the DL RS configuration and reception according to an exemplary embodiment of the disclosure.

FIG. 25 shows an alternative embodiment similar to FIG. 24. In this exemplary embodiment, the UE has received from a PDCCH (e.g. GC-PDCCH) from TRP #0's COT the availabilityTRP parameter indicating {1, 1} which means the binary value is '1' for both TRP #0 and TRP #1, and then the UE may perform DL reception (e.g. PDCCH, PDSCH, SSB, CSI-RS) at an occasion from TRP #0. However, during an overlapping time domain T1 as shown in FIG. 25, the UE may not perform DL RS reception from TRP #1.

Figure 26:
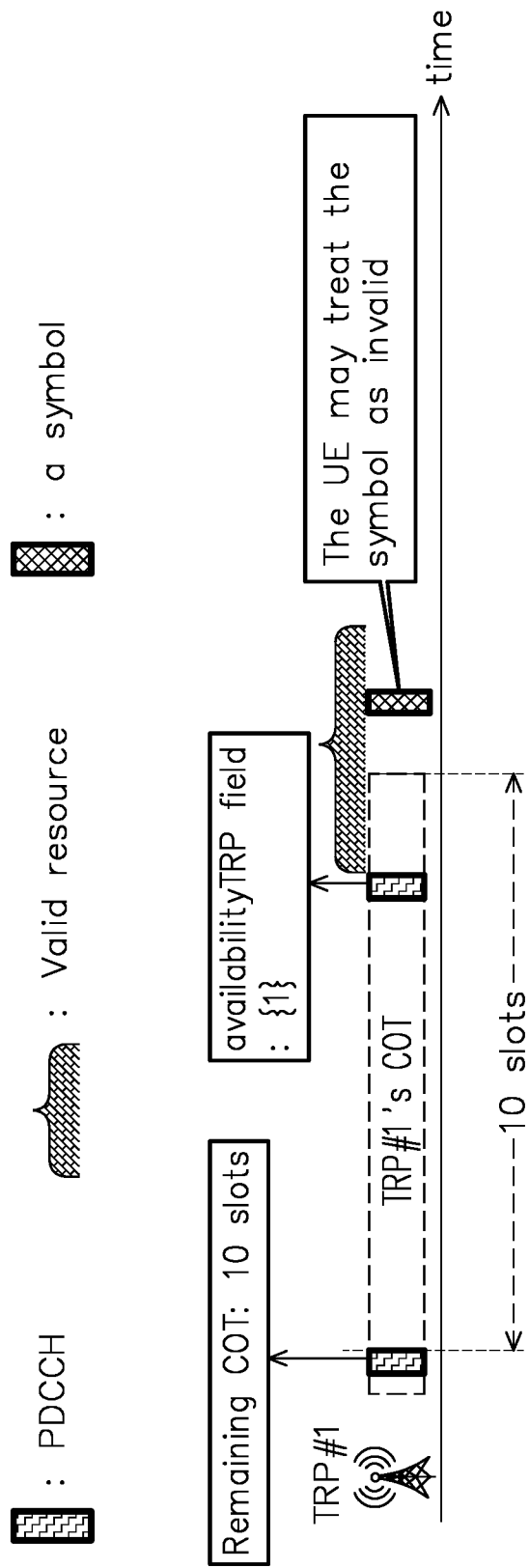
FIG. 26 illustrates a treatment of an invalid symbol according to an exemplary embodiment of the disclosure.
Figure 27:
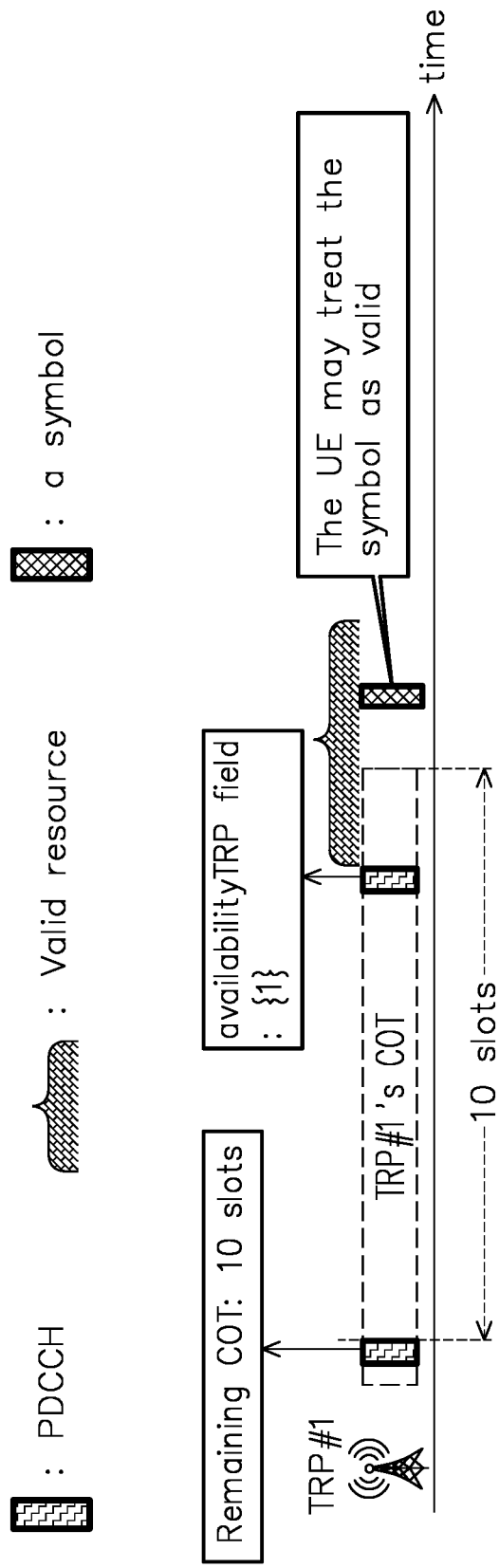
FIG. 27 illustrates another treatment of an invalid symbol according to an exemplary embodiment of the disclosure.

The exemplary embodiment of FIG. 26 shows the treatment of a symbol. A UE could be provided with a COT of N (e.g. 10) slots of a TRP (e.g. TRP #1). Within the COT of the TRP #1, the UE may receive a first PDCCH associated with TRP #1. Subsequently, the UE may receive a second PDCCH having the availabilityTRP parameter indicating a binary '1' for TRP #1. However, if the symbol of the valid resource indicated by availabilityTRP parameter corresponding to TRP #1 does not belong to the COT which the UE has been provided with, then the symbol is to be treated as invalid. Alternatively, the exemplary embodiment of FIG. 27 is similar to the exemplary embodiment of FIG. 26 except that the UE may assume that the COT is being extended beyond the COT that the UE has been provided with. In other words, the valid resource would extend beyond the COT for a predetermined amount of time. Thus, the UE may treat the symbol outside of the COT has being valid.

Figure 28:
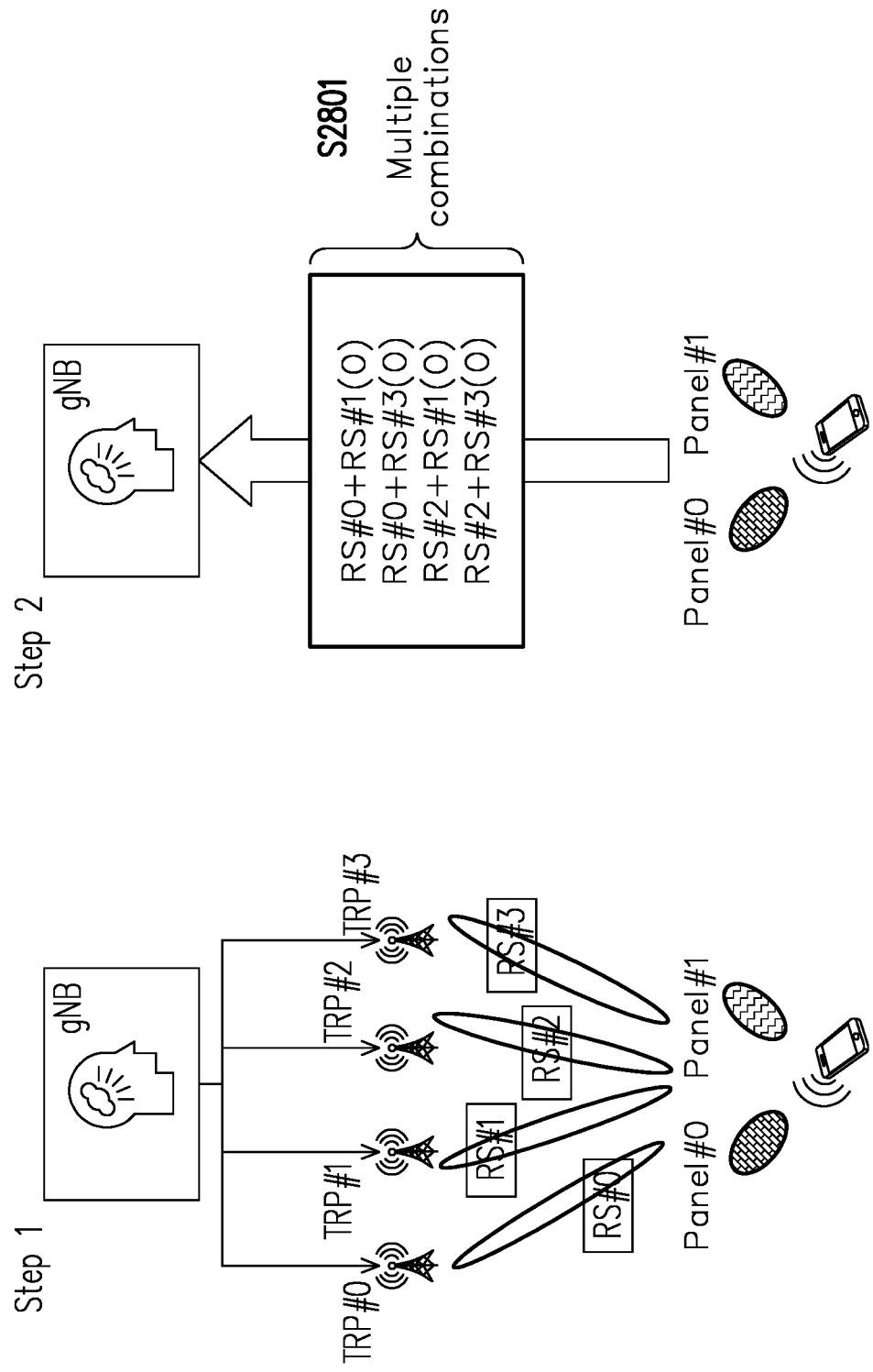
FIG. 28 illustrates a network configuring a UE for scheduling through M-TRP in an unlicensed band when the UE has multiple panels available according to an exemplary embodiment of the disclosure.
Figure 29:
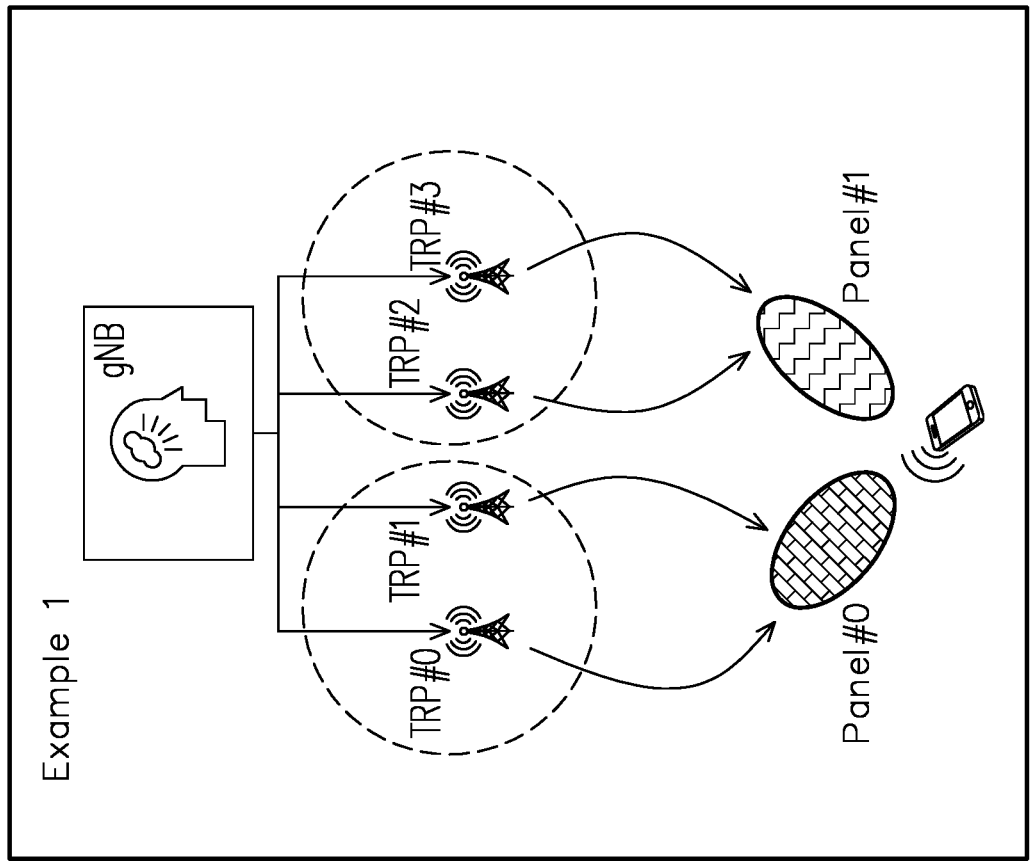
FIG. 29 illustrates mapping between M-TRP and UE's panel according to an exemplary embodiment of the disclosure.
Figure 30:
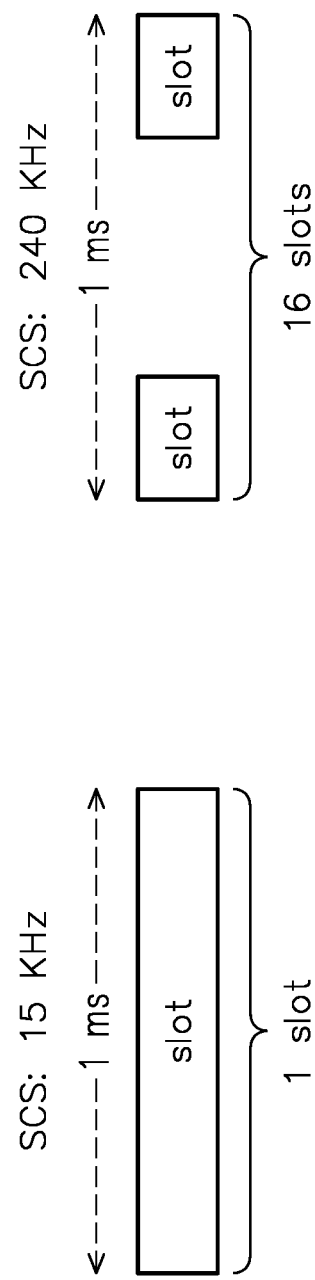
FIG. 30 illustrates subcarrier spacing for high frequency band.

Next, the disclosure provides a mechanism for a network to configure a UE for scheduling through M-TRP in an unlicensed band when the UE has multiple panels available. FIG. 28 shows a UE connecting to a network through M-TRP in an unlicensed band. As shown in FIG. 28, there could be two steps involved with configuring a UE under such circumstance. In step 1, a UE would perform measurements of reference signals transmitted by the M-TRP by using multiple panels. In step 2, after performing the measurements, the UE may report back to the gNB multiple combinations (S2801) to express which RS could be received simultaneously. FIG. 29 shows a mapping between M-TRP and UE's panel. A gNB may configure multiple TRPs, e.g. TRP #0 to TRP #(n−1) to a UE. The UE may have m panels (s) where m is an integer greater than 0. The UE may perform DL receptions by a panel from one or more TRPs. FIG. 30 illustrates subcarrier spacing (SCS) for high frequency band. The SCS for high frequency band could be 240 kilohertz (KHz), 480 KHz, and 960 KHz. For a millisecond, there could be one slot in the millisecond (ms) for 15 KHz SCS. However, there could be 16 slots in 1 ms for 240 KHz SCS. The number of PDCCH monitoring occasions for 240 KHz could be 16 times of the 15 KHz SCS.

Figure 31:
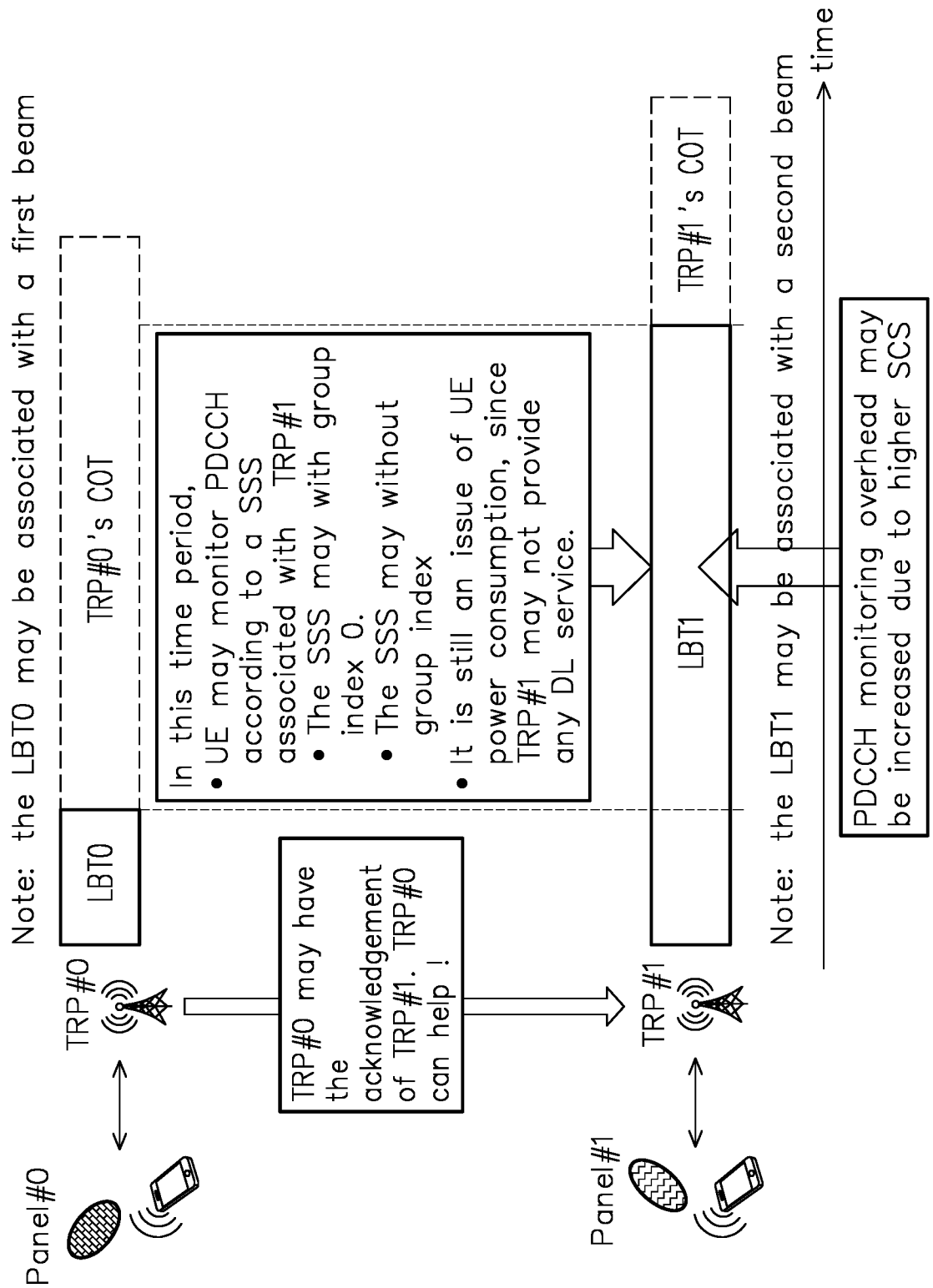
FIG. 31 illustrates an issue of a TRP not providing any DL service.

FIG. 31 illustrates using multiple panels to communicate with M-TRP. As show in FIG. 31, panel #0 could be used to communicate with TRP #0 while panel #1 could be used to communicate with TRP #1. TRP #0 and TRP1 could be aware of each other and may assist each other. The LBT0 and TRP #0's COT are associated with a first beam, and LBT1 and TRP #1's COT are associated with a second beam. In the overlapping time period between LBT1 and TRP #0's COT as shown in FIG. 31, the UE may monitor PDCCH according to a search space set (SSS) associated with TRP #1 where the SSS may be with group index 0 or the SSB may be without any group index. However, during such time period, TRP #1 may not provide any DL service because since TRP #1 may not have procured any communication channel. Moreover, the PDCCH monitoring overhead could be increased because of higher SCS.

In order to configure a UE for scheduling through M-TRP in an unlicensed band by taking multiple panels into account and at the same time resolve the issue described above, the disclosure provides a mechanism for enhanced PDCCH monitoring by information sharing among M-TRP. The disclosure provides a circumstance as for when to stop or resume PDCCH monitoring by a panel and a time period for PDCCH monitoring by a panel.

Figure 32:
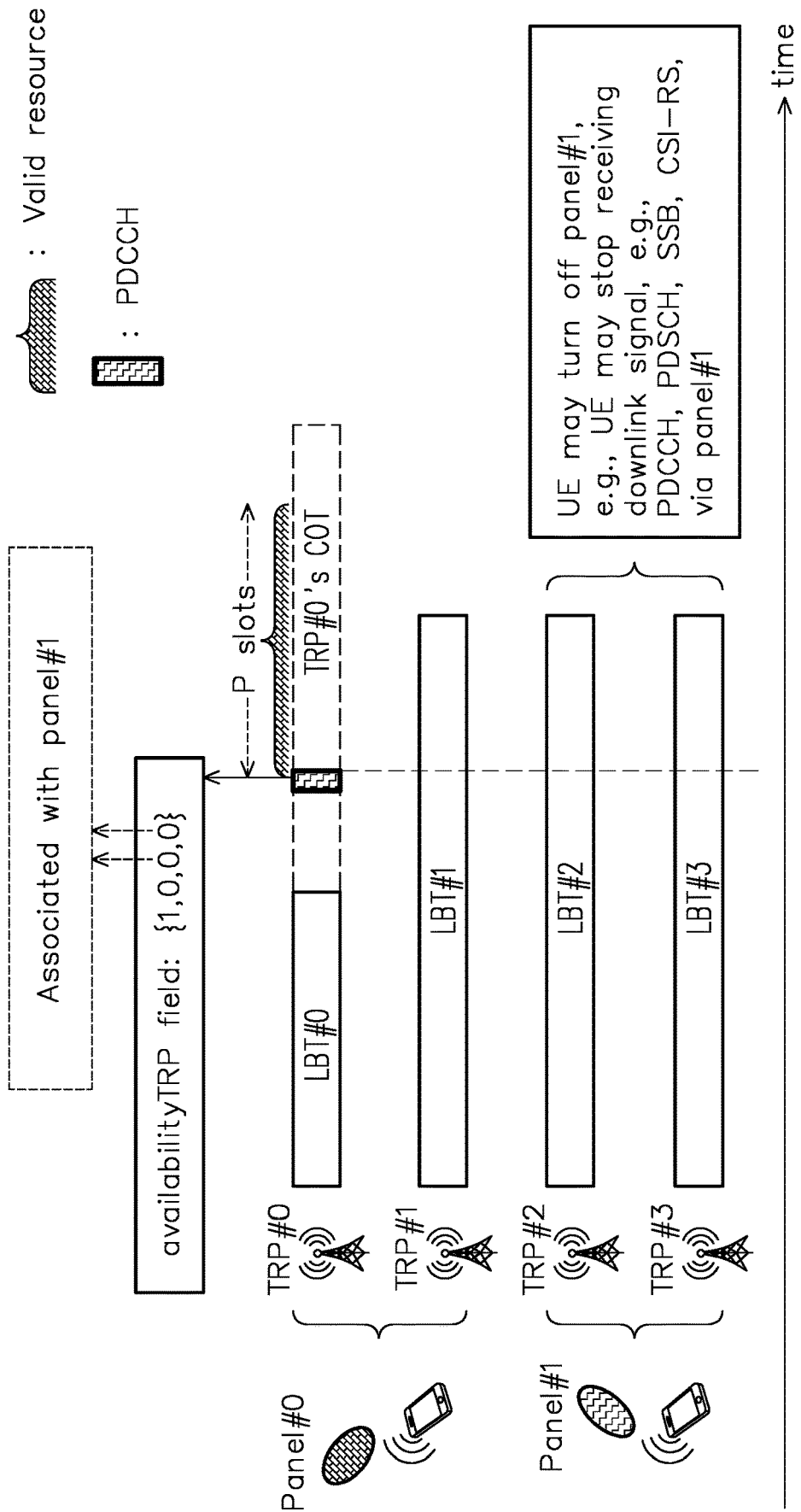
FIG. 32 illustrates PDCCH monitoring by a UE having multiple panels based on the availabilityTRP parameter according to a first exemplary embodiment of the disclosure.

FIG. 32 shows an exemplary embodiment of PDCCH monitoring by a UE having multiple panels based on the availabilityTRP parameter. The UE has but is not limited to Panel #0 and Panel #1. Panel #0 could be used to communicate with TRP #0 and TRP #1 while Panel #1 is used to communicate with TRP #2 and TRP #3. Since there are 4 TRPs, the availabilityTRP parameter may have four bits which are four binary digits. As shown in FIG. 31, the availabilityTRP parameter is {1, 0, 0, 0} which means that TRP #0 is available for scheduling while other TRPs are not available for scheduling. Since the third and the fourth bits are both '0', it means that the Panel #1 is not serving any purpose and thus the UE may turn off Panel #1. By taking off Panel #1, the UE would stop receiving DL signals such as PDCCH, PDSCH, SSB, CSI-RS and thus would be able to conserve power.

Figure 33:
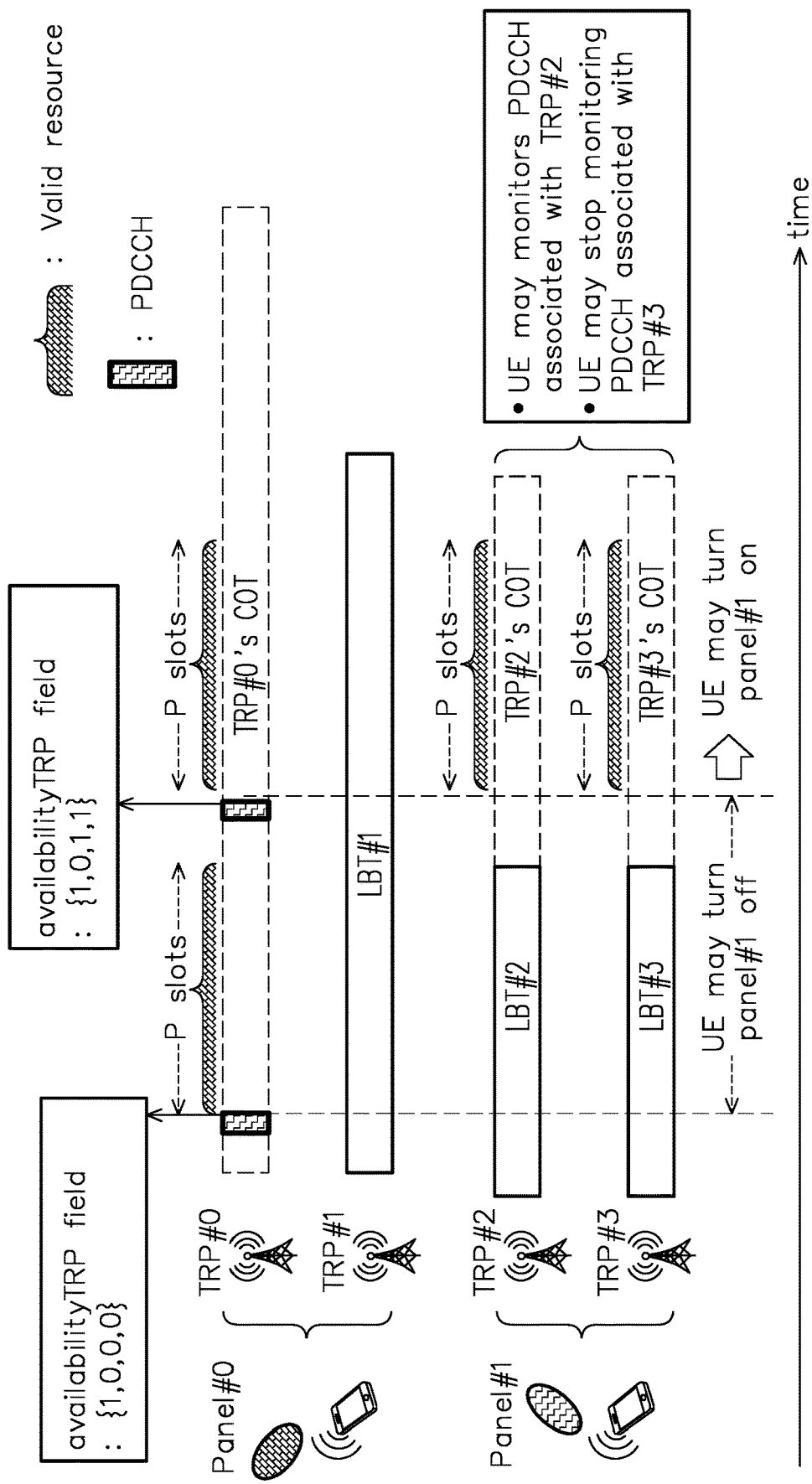
FIG. 33 illustrates PDCCH monitoring by a UE having multiple panels based on the availabilityTRP parameter according to a second exemplary embodiment of the disclosure.

FIG. 33 shows an exemplary embodiment of PDCCH monitoring by a panel of a UE for another panel. In this exemplary embodiment, the UE receives from a first PDCCH within the TRP #0's COT the availabilityTRP parameter indicating {1, 0, 0, 0}, and this means that the UE could be configured to turn off Panel #1 while the P slots of the TRP #0's COT contain valid resources. In response to the UE receiving a second PDCCH within the TRP #0's COT the availabilityTRP parameter indicating {1, 0, 1, 1}, and this means that TRP #0, TRP #2, and TRP #3 are all available for scheduling for the UE. Since either the third bit or the fourth bit of the availabilityTRP parameter indicate a binary '1', the UE may turn back on Panel #1 as both the TRP #2's COT and TRP #3's COT may contain valid resources within their respective P slots. However, since both TRP #2 and TRP #3 are both available, the scheduling of the UE could be based on the priority of the TRP. Assuming that TRP #2 has a higher priority than TRP #3, the UE may monitor the PDCCH associated with TRP #2 and may stop monitoring the PDCCH associated with TRP #3.

Figure 34:
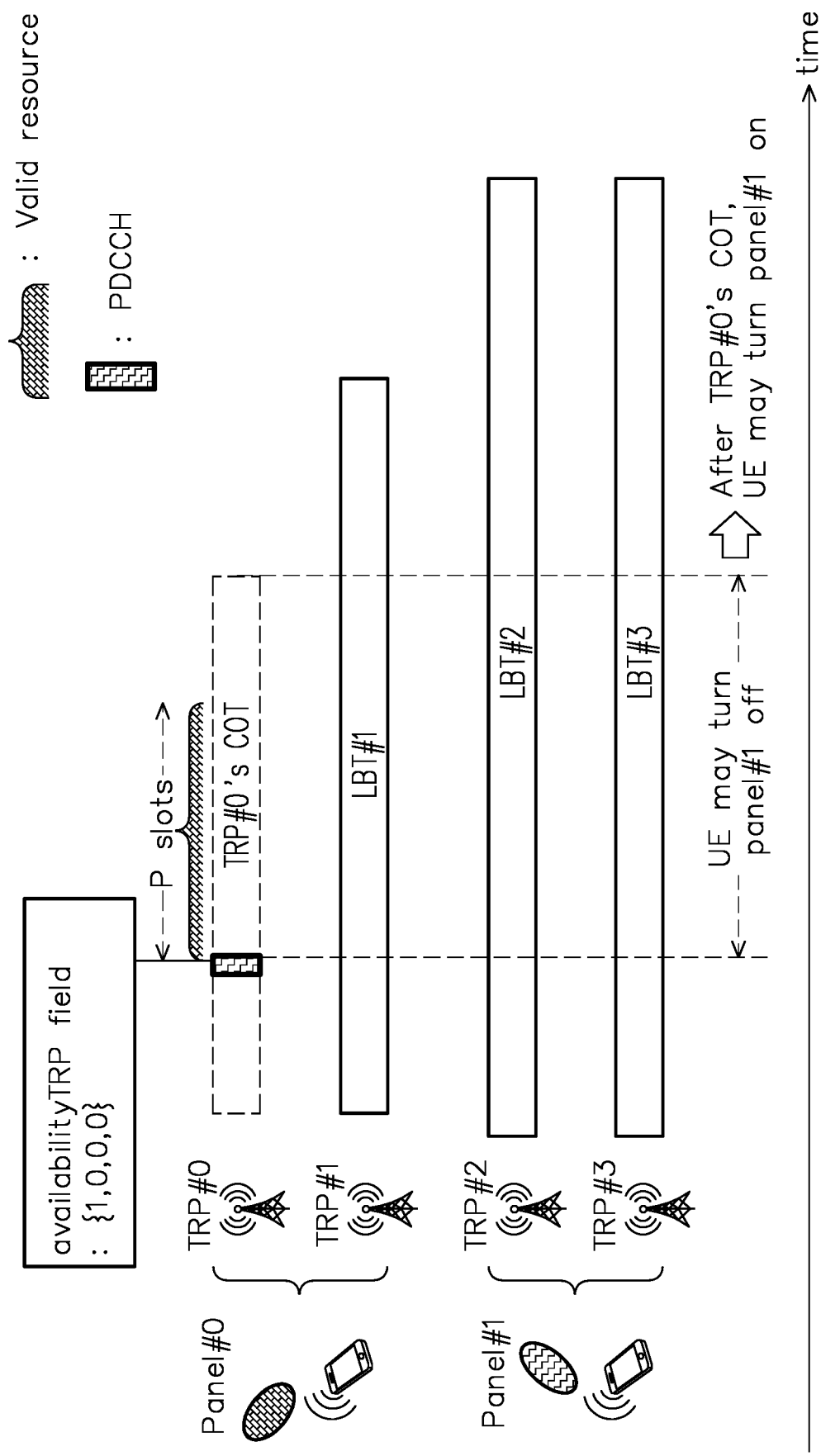
FIG. 34 illustrates PDCCH monitoring by a UE having multiple panels based on the availabilityTRP parameter according to a third exemplary embodiment of the disclosure.

FIG. 34 shows an exemplary embodiment of PDCCH monitoring by a UE having multiple panels based on the availabilityTRP parameter after an available COT having been expired. In this exemplary embodiment, a UE has receiving with TRP #0's COT a PDCCH having the availabilityTRP parameter indicating {1, 0, 0, 0}, and this means that only TRP #0 is available for scheduling the UE and thus Panel #1 is turned off. The PDCCH that was received has indicated N slots within TRP #0's COT. However, after that indicated N slots have expired within TRP #0's COT, there is no valid resource available to transmit the availabilityTRP parameter as the previously indicated N slots have expired. Under such circumstance, the UE may turn back on Panel #1.

Figure 35:
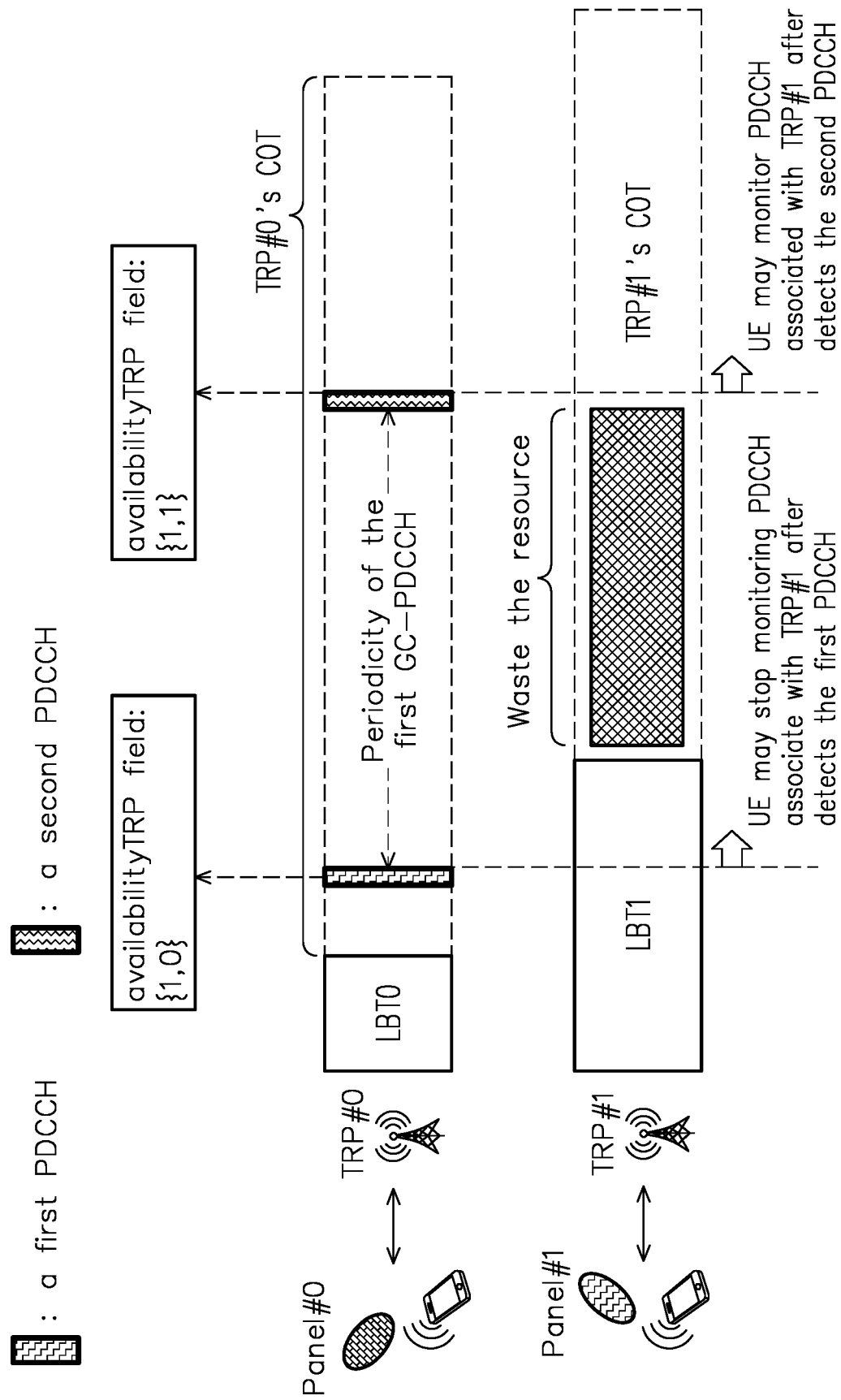
FIG. 35 illustrates an issue of a waste of resources after the UE stop monitoring the PDCCH of a particular TRP upon detecting a PDCCH.

Next, the disclosure provides a mechanism which includes a time period design for PDCCH monitoring by a panel. The mechanism is aimed to resolve at least the following two issues as shown and described in FIG. 35 and FIG. 36. FIG. 35 illustrates an issue of a waste of resources after the UE stop monitoring the PDCCH of a particular TRP upon detecting a PDCCH. Assuming that Panel #0 has been configured to communicate with TRP #0 and Panel #1 has been configured to communicate with TRP #1. After a first PDCCH is received from TRP #0's COT and contains availabilityTRP parameter indicating {1, 0}, Panel #0 is configured to remain on while Panel #1 is turned off. After a second PDCCH is received from TRP #0's COT and contains availabilityTRP parameter indicating {1, 1}, Panel #1 is configured to be turned back on. While Panel #1 is turned off, the UE would stop monitoring the PDCCH associated with TRP #1 after detecting the first PDCCH. After Panel #1 is turned back on, the UE would monitor the PDCCH associated with TRP #1 after detecting the second PDCCH. However, while Panel #1 is turned off, there would be a period in TRP #1's COT where the resources are being wasted.

Figure 36:
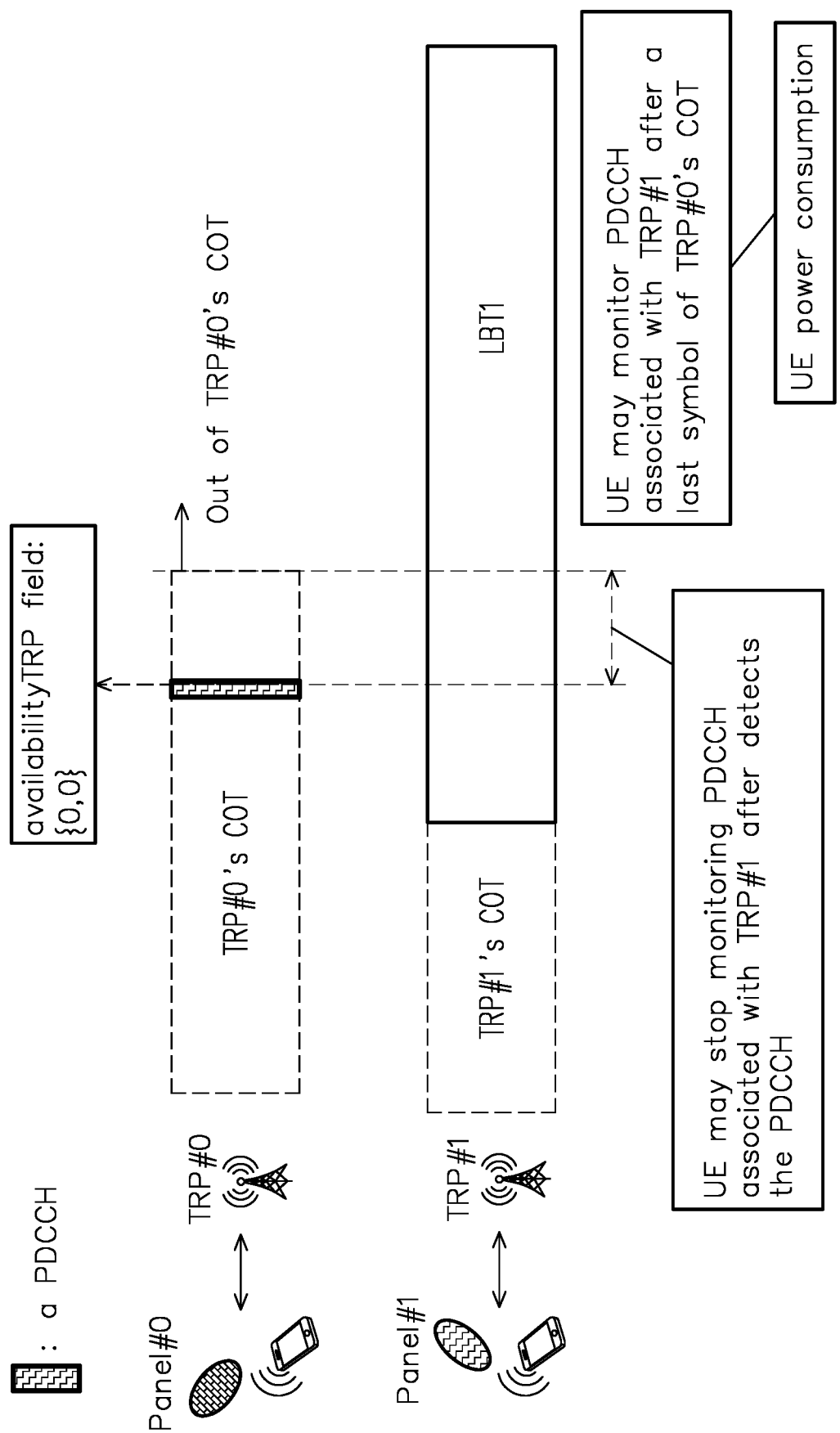
FIG. 36 illustrates an issue of an increased power consumption after the UE start monitoring for the PDCCH of a particular TRP upon the expiration of a valid resource previously allocated within a TRP's COT.

FIG. 36 illustrates an issue of an increased power consumption after the UE start monitoring for the PDCCH of a particular TRP upon the expiration of a valid resource previously allocated within a TRP's COT. Assuming that Panel #0 has been configured to communicate with TRP #0 and Panel #1 has been configured to communicate with TRP #1. After a PDCCH is received from TRP #0's COT and contains availabilityTRP parameter indicating {0, 0}, the UE may stop monitoring the PDCCH associated with TRP #1 after detecting the PDCCH. However, after the valid resource allocated for the UE in TRP #0's COT has expired, the UE may once again monitor for the PDCCH associated with TRP #1 after the last symbol of TRP #0's COT. This would lead to an increased power consumption.

In order to cope with the issues of FIG. 35 and FIG. 36, the disclosure provides an embodiment of an RRC configuration table as shown in FIG. 37. FIG. 37 illustrates an RRC configuration table according to an exemplary embodiment of the disclosure. The RRC configuration table could be used to design a specific action to be performed at a specific point in time. The row of the table could be a time period corresponding to a particular bit value, and the time period could a symbol, a time slot, multiple symbols, multiple time slots, or any combination of the above. For example, referring to FIG. 37, the bit value '00' may correspond to 8 symbols, the bit value '01' may correspond to 5 slots, the bit value '10' may correspond to 9 symbols plus 4 slots, the bit value '11' may correspond to 6 symbols plus 10 slots.

Figure 38:
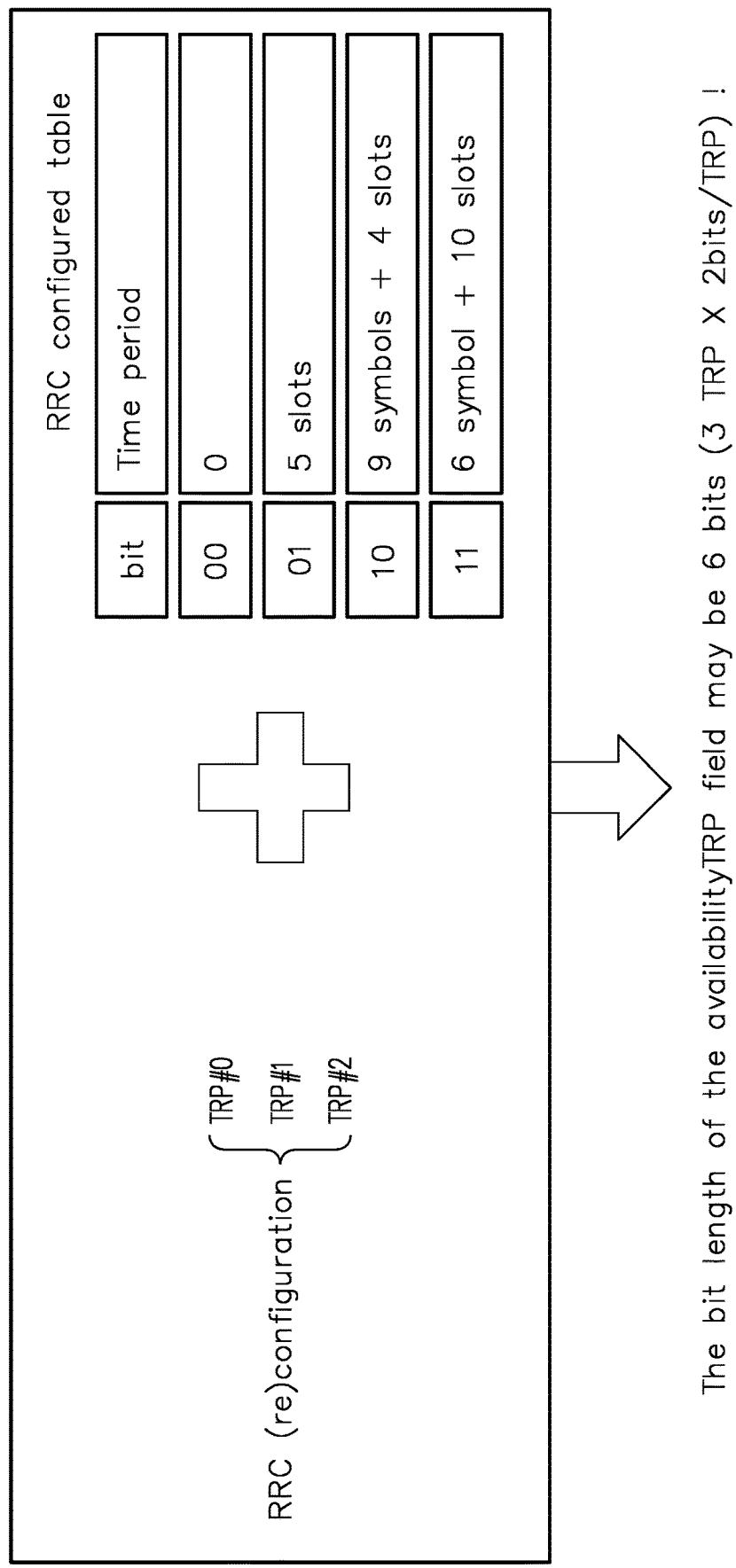
FIG. 38 illustrates an updated availabilityTRP parameter table according to an exemplary embodiment of the disclosure.

In order to utilize the RRC configuration table, the availabilityTRP parameter could be lengthened to accommodate the extra time period information per TRP. FIG. 38 shows an updated the availabilityTRP parameter which has existing bits for each TRP as well as the extra two bits per TRP. Since each TRP would correspond to 2 bits, having 3 TRPs, for example, would mean that the availabilityTRP parameter has 6 bits.

Figure 39:
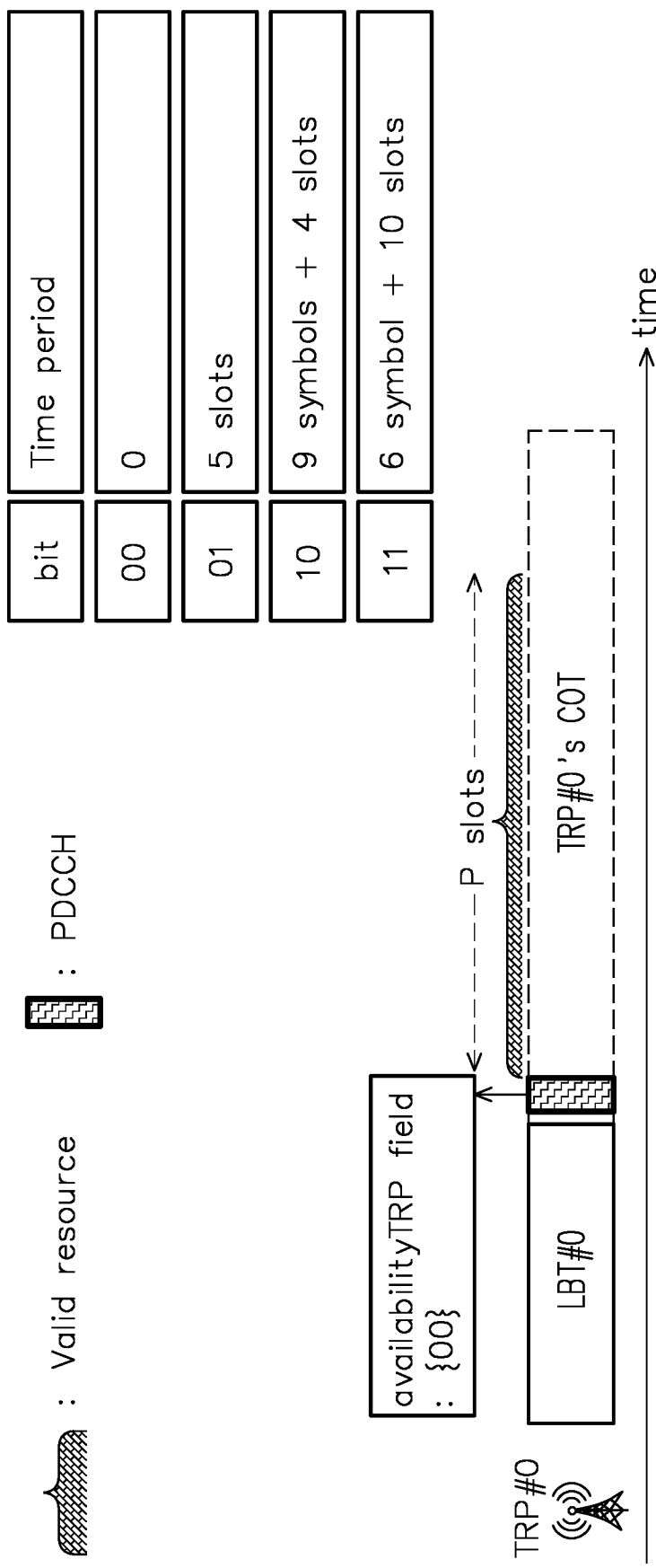
FIG. 39 illustrates using an RRC configuration table in the availabilityTRP parameter table according to a first exemplary embodiment of the disclosure.

One utilization of the availabilityTRP parameter is shown in FIG. 39. In this exemplary embodiment, a UE has received from TRP #0's COT the availabilityTRP parameter indicating {00}. As shown in FIG. 39, the bit value '00' corresponds to a time period of 0. This would mean that the time duration (e.g. P slots) starting from a symbol which is after a last symbol of the PDCCH could be treated as a valid resource of the TRP #0. In other words, the valid resource of the TRP #0 would start from a symbol which is immediately after the last symbol of the PDCCH.

Figure 40:
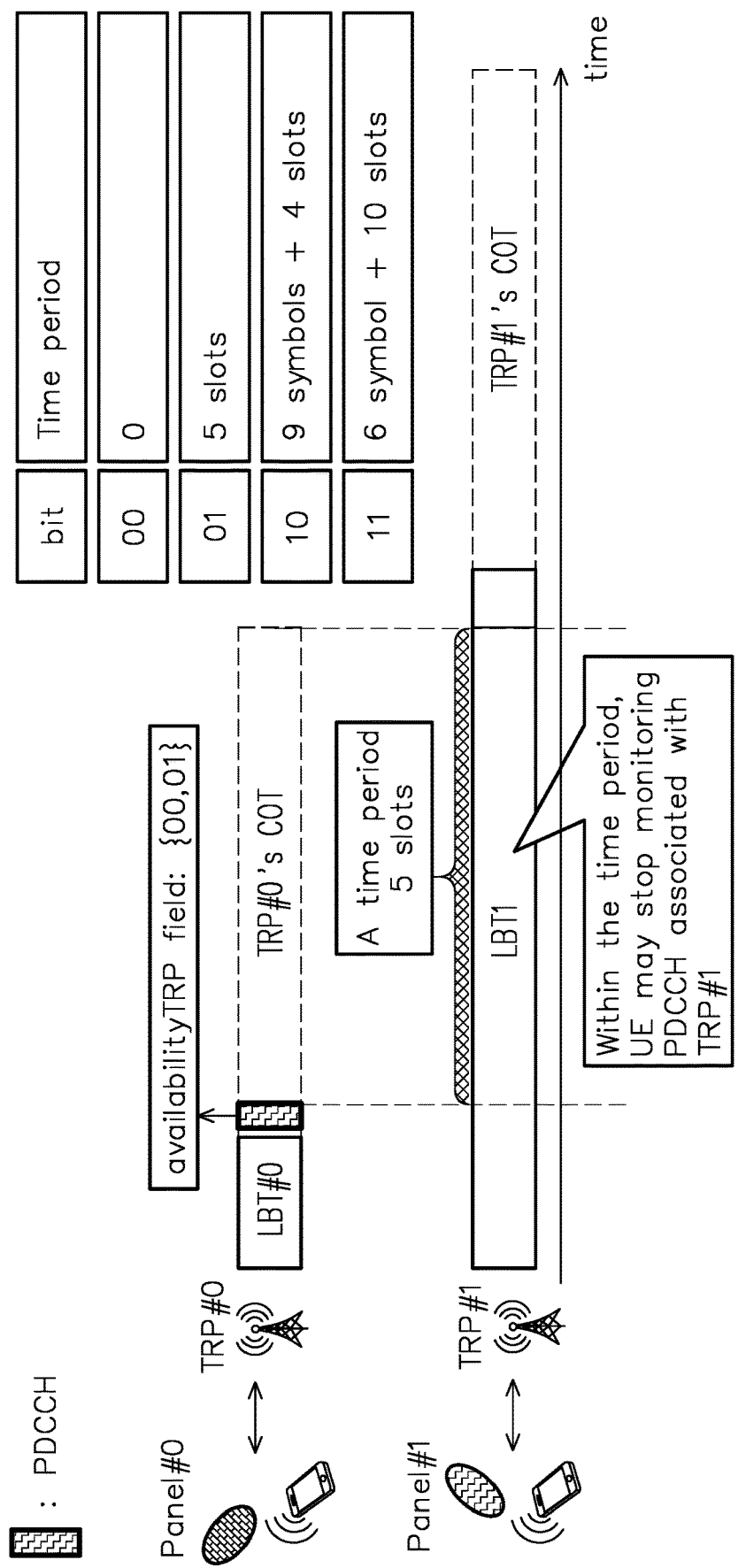
FIG. 40 illustrates using an RRC configuration table in the availabilityTRP parameter table according to a second exemplary embodiment of the disclosure.

FIG. 40 shows another exemplary embodiment involving two TRPs. It is assumed that Panel #0 is configured to communicate with TRP #0 and Panel #1 is configured to communicate with TRP #1. In response to the UE receiving from a PDCCH within TRP #0's COT and the availabilityTRP parameter within the PDCCH indicates {00,01}, it means that right after the last symbol of the PDCCH, the UE would start monitoring the PDCCH of TRP #0. Since the bit value '01' corresponds to 5 time slots, the UE would stop monitoring the PDCCH associated with TRP #1 within the 5 time slots.

Figure 41:
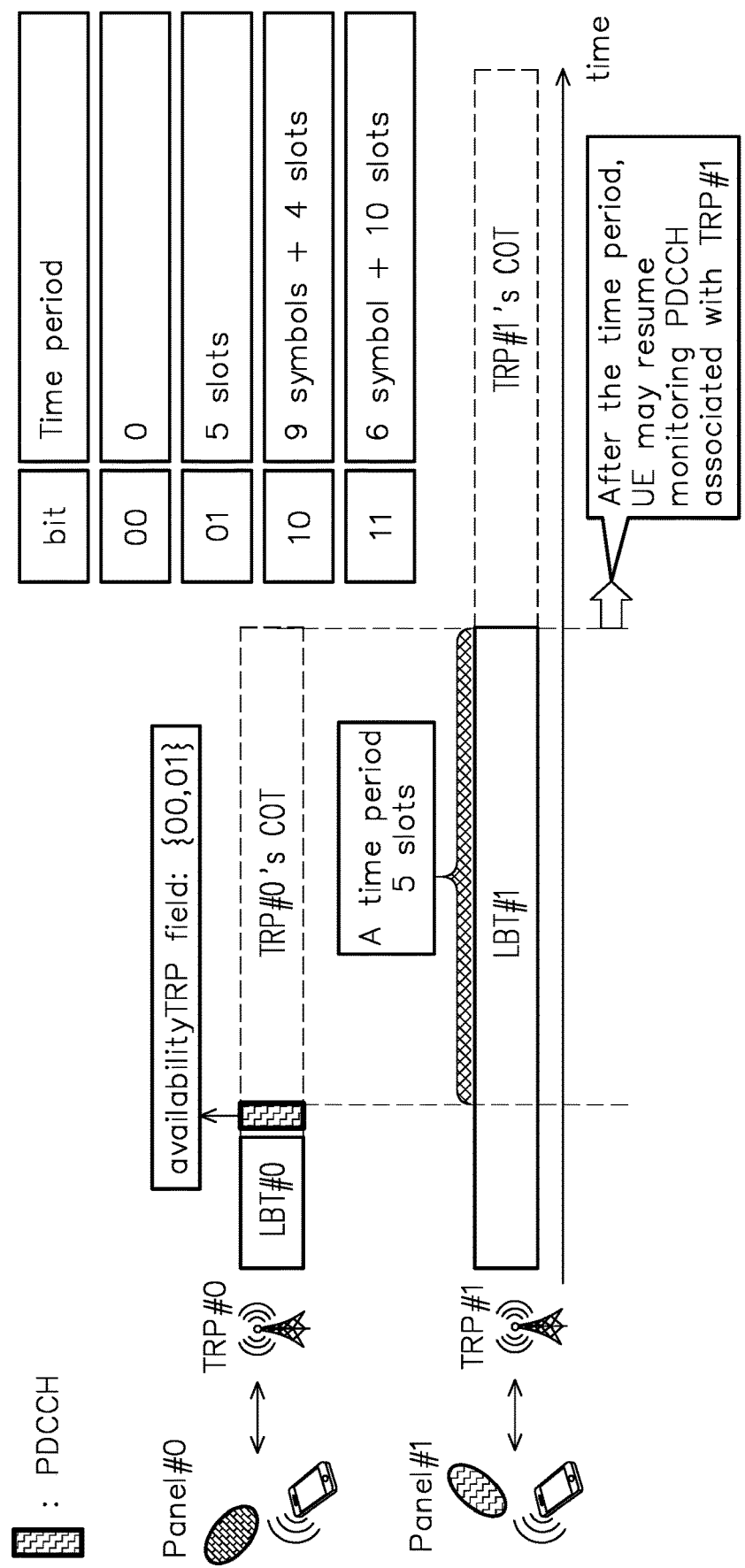
FIG. 41 illustrates using an RRC configuration table in the availabilityTRP parameter table according to a third exemplary embodiment of the disclosure.

FIG. 41 shows another exemplary embodiment that is similar to the exemplary embodiment of FIG. 40. It is assumed that Panel #0 is configured to communicate with TRP #0 and Panel #1 is configured to communicate with TRP #1. In response to the UE receiving from a PDCCH within TRP #0's COT and the availabilityTRP parameter within the PDCCH indicates {00,01}, it means that right after the last symbol of the PDCCH, the UE would start monitoring the PDCCH of TRP #0. In other words, as long as the bits in the availabilityTRP parameter correspond to TRP #1 is not zero, the UE would stop monitoring the PDCCH corresponding to TRP #1 for the time period as indicated by the RRC configured table. Since the bit value '01' corresponds to 5 time slots, the UE would stop monitoring the PDCCH associated with TRP #1 within the 5 time slots. After the 5 time slots have expired, the UE would resume monitoring the PDCCH associated with TRP #1.

Figure 42:
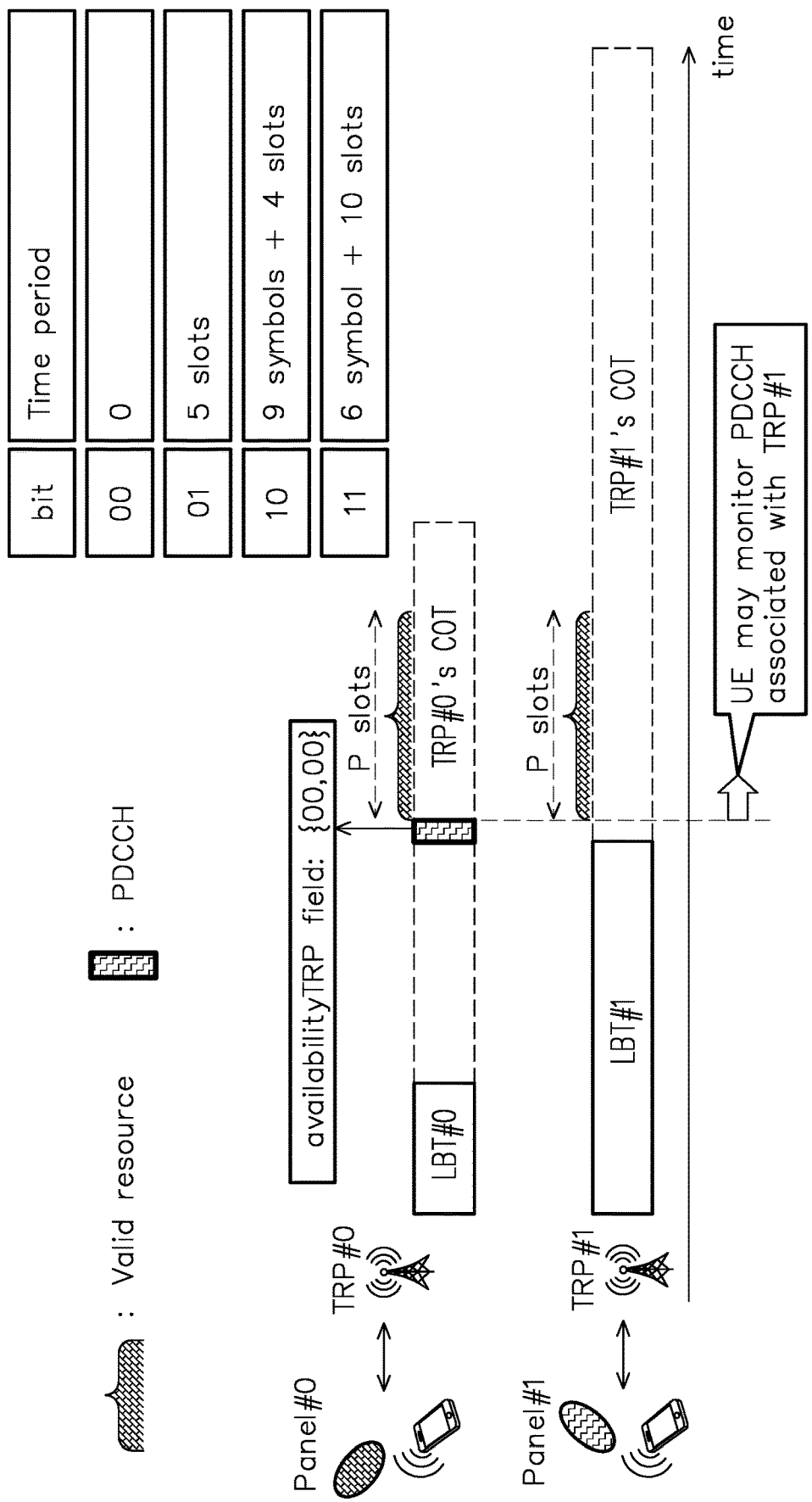
FIG. 42 illustrates using an RRC configuration table in the availabilityTRP parameter table according to a fourth exemplary embodiment of the disclosure.

FIG. 42 shows another exemplary embodiment involving two TRPs. It is assumed that Panel #0 is configured to communicate with TRP #0 and Panel #1 is configured to communicate with TRP #1. In response to the UE receiving from a PDCCH within TRP #0's COT and the availabilityTRP parameter within the PDCCH indicates {00,00}, the UE would start monitoring the PDCCH of TRP #1. Since the bit value '00' corresponds to a time period of zero, the UE would start monitoring the PDCCH of TRP #1 immediately right after the last symbol of the PDCCH.

Figure 43:
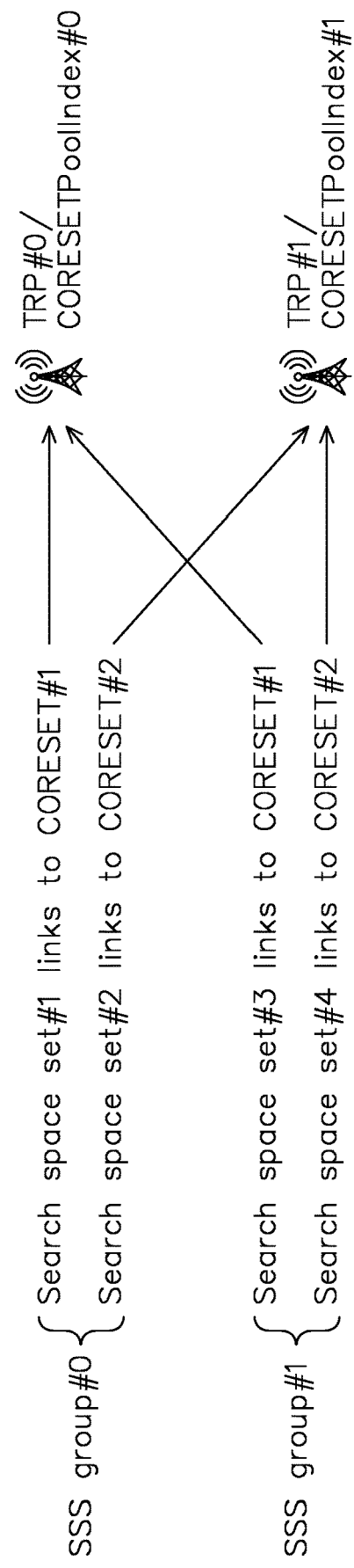
FIG. 43 illustrates a mapping between an SSS group and TRP.

Next, the disclosure adds the TRP concept into SSS group switching. FIG. 43 shows a mapping between an SSS group and TRP. For example, the SSS group #0 may contain a SSS #1 which links to CORESET #1 and a SSS #2 which links to CORESET #2. The SSS group #1 may contain an SSS #3 which links to CORESET #1 and a SSS #4 which links to CORESET #2. Once the conditions of SSS group switching has been met, the UE may change SSS group corresponding to TRP #0 and TRP #1 simultaneously. It should be noted that out of the gNB's COT, the UE may monitor PDCCH occasion according to SSS group #0 while within the gNB's COT, the UE may monitor the PDCCH occasion according to SSS group #1.

Figure 44:
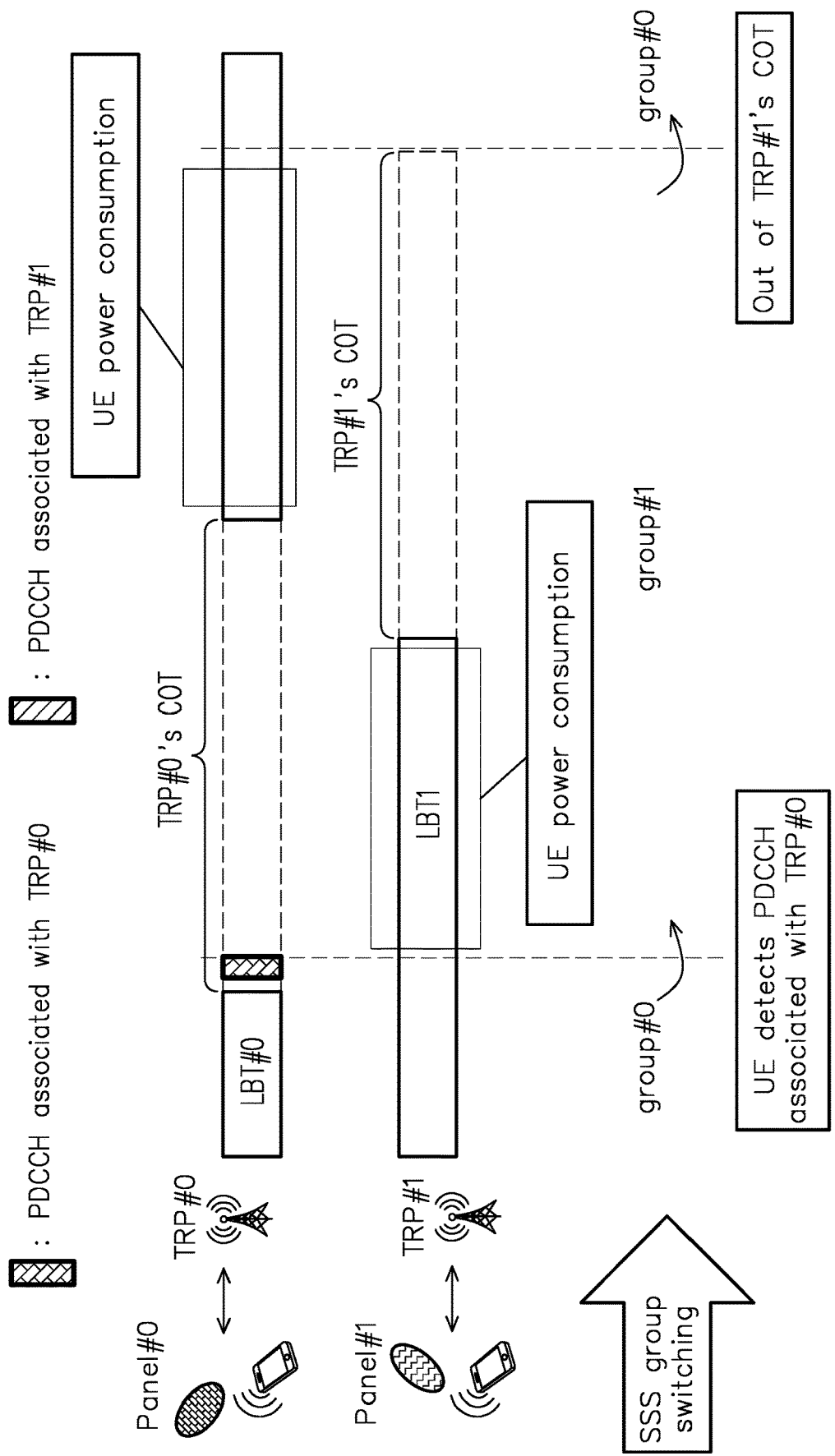
FIG. 44 illustrates an issue related to SSS group switching.

FIG. 44 shows an issue related to SSS group switching. It is assumed that Panel #0 is configured to communicate with TRP #0 and Panel #1 is configured to communicate with TRP #1. After a UE detects a PDCCH associated with TRP #0, the UE may switch from SSS group #0 to SSS group #1 leading to a UE's power consumption in LBT1. Moreover, before the UE switches from SSS group #1 back to SSS group #0 and switching out of TRP #1's COT, it would also lead to UE's power consumption in TRP #1's COT.

Figure 45:
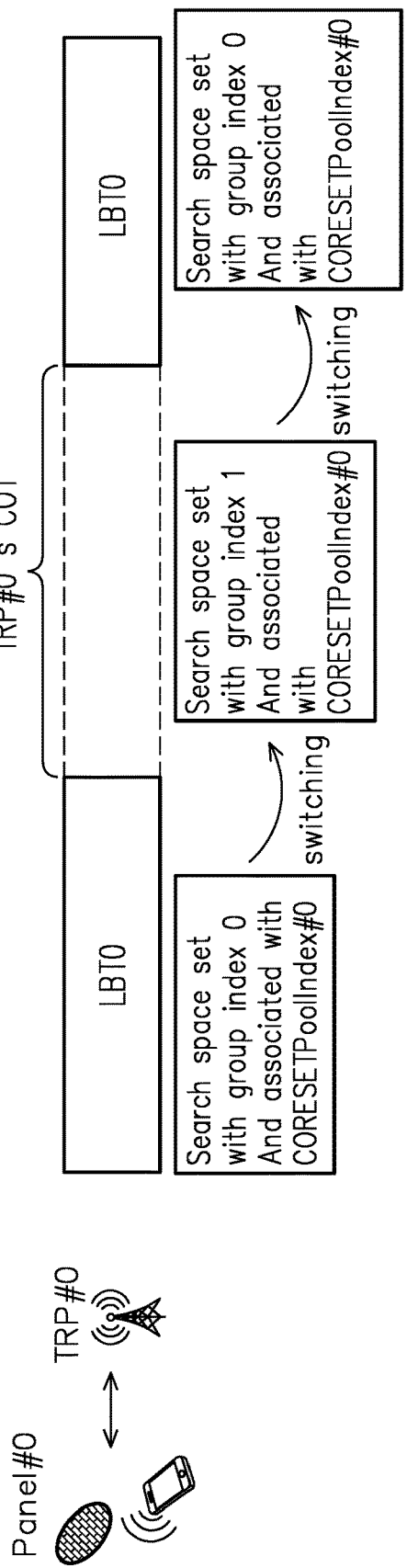
FIG. 45 illustrates SSS group switching according to an exemplary embodiment of the disclosure.
Figure 45:
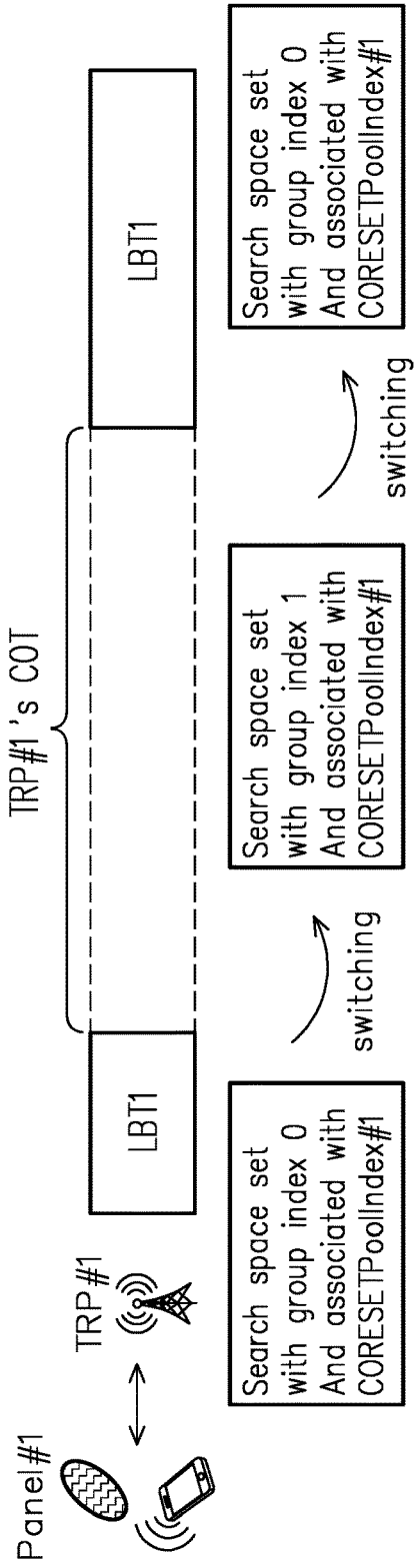

In order to minimize the extra power consumption in the issue related to SSS group switching described above, the disclosure provides an SSS group switching mechanism by adding CORESETPoolIndex into SSS group switching. Referring to FIG. 45, it is assumed that Panel #0 is configured to communicate with TRP #0 and Panel #1 is configured to communicate with TRP #1. Also, it is assumed that the LBT0 is performed by TRP #0 and is associated with a first beam while the LBT1 is performed by TRP #1 and is associated with a second beam. During the LBT0 period associated with TRP #0, the SSS group #0 is associated with CORESETPoolIndex #0. After SSS group #0 is switched to SSS group #1, the SSS group #1 is associated with CORE- SETPoolIndex #0. After SSS group #1 is switched back to SSS group #0, the SSS group #0 is associated with CORESETPoolIndex #0. During the LBT1 period associated with TRP #1, the SSS group #0 is associated with CORESETPoolIndex #1. After SSS group #0 is switched to SSS group #1, the SSS group #1 is associated with CORESETPoolIndex #1. After SSS group #1 is switched back to SSS group #0, the SSS group #0 is associated with CORESETPoolIndex #1.

Figure 46:
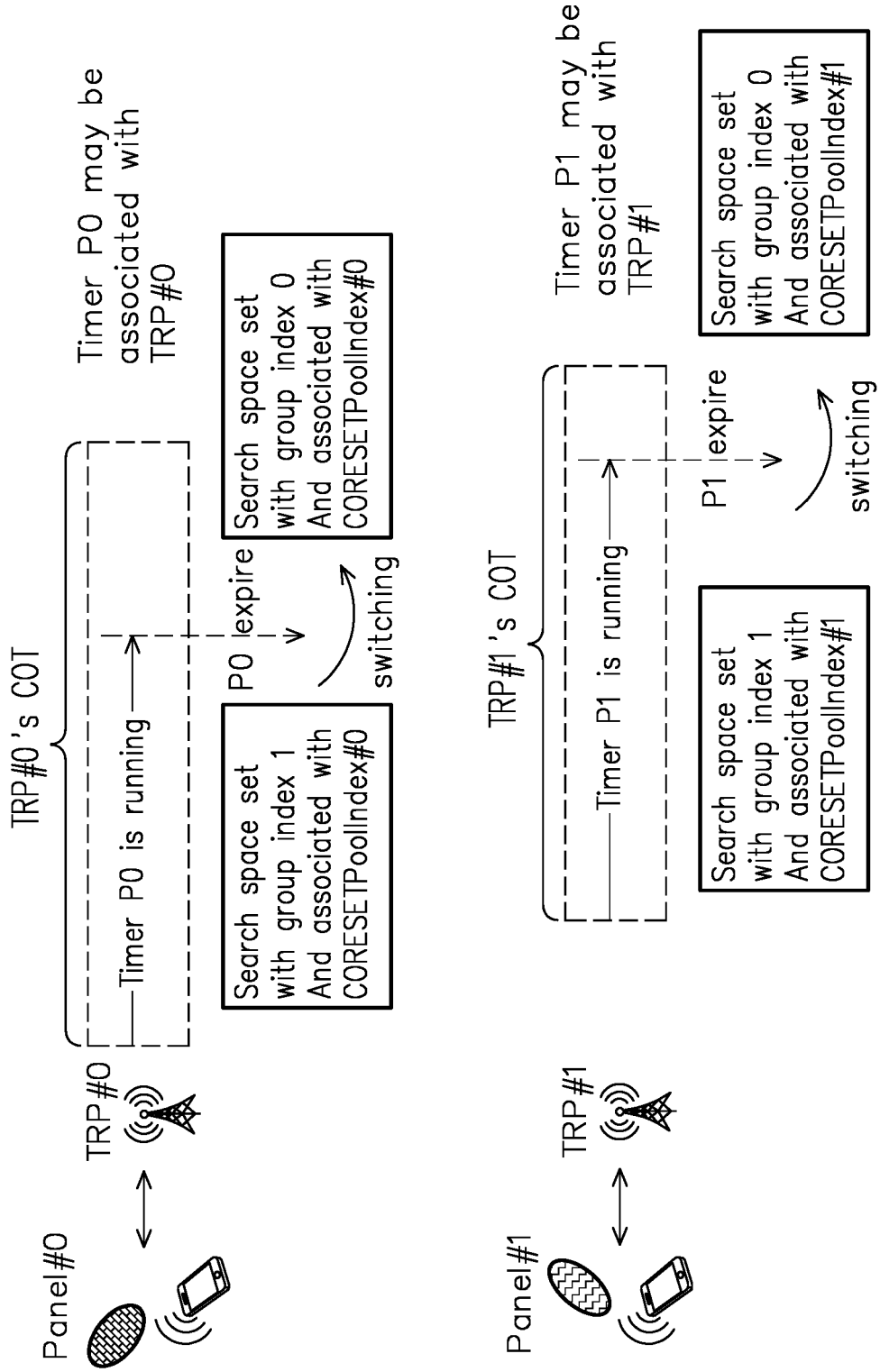
FIG. 46 illustrates SSS group switching according to an exemplary embodiment of the disclosure.

FIG. 46 shows an exemplary embodiment of using a first timer P0 associated with TRP #0 and a second timer P1 associated with TRP #1. It is assumed that Panel #0 is configured to communicate with TRP #0 and Panel #1 is configured to communicate with TRP #1. Also, it is assumed that the LBT0 is performed by TRP #0 and is associated with a first beam while the LBT1 is performed by TRP #1 and is associated with a second beam. During the LBT0 period associated with TRP #0, the SSS group #0 is associated with CORESETPoolIndex #0. While operating under SSS group #1, after the first timer P0 has expired, the SSS group #1 is associated with CORESETPoolIndex #0. After SSS group #1 is switched to SSS group #0, and the SSS group #0 is associated with CORESETPoolIndex #0. Similarly, During the LBT1 period associated with TRP #1, the SSS group #1 is associated with CORESETPoolIndex #1. After the second timer P1 is expired, SSS group #1 is switched to SSS group #0, the SSS group #1 is associated with CORESETPoolIndex #1.

The disclosure also provides exemplary embodiments related to SearchSpaceSwitchTrigger. If a UE is provided by SearchSpaceSwitchTrigger a location of a search space set switching bit for a serving cell in a DCI format 2_0, the UE would detect the DCI format 2_0 corresponding to a CORESETPoolIndex in a slot. If the UE is not monitoring PDCCH according to search space sets associated with the CORESETPoolIndex and with group index 0, the UE would start monitoring PDCCH according to search space sets associated with the CORESETPoolIndex and with group index 0 and would stop monitoring PDCCH according to search space sets associated with the CORESETPoolIndex and with group index 1 on the serving cell at a first slot that is at least P symbols after the last symbol of the PDCCH with the DCI format 2_0, if a value of the search space set switching bit is 0.

Similarly, if a UE is provided by SearchSpaceSwitchTrigger a location of a search space set switching bit for a serving cell in a DCI format 2_0, and the UE would detect the DCI format 2_0 corresponding to a CORESETPollIndex in a slot. If the UE is not monitoring PDCCH according to search space sets associated with the CORESETPoolIndex and with group index 1, the UE would start monitoring PDCCH according to search space sets associated with the CORESETPoolIndex and with group index 1 and would stop monitoring PDCCH according to search space sets associated with the CORESETPoolIndex and with group index 0 on the serving cell at a first slot that is at least P symbols after the last symbol of the PDCCH with the DCI format 2_0, if a value of the search space set switching bit is 1.

Similarly, if a UE is provided by SearchSpaceSwitchTrigger a location of a search space set switching bit for a serving cell in a DCI format 2_0, the UE would and detect the DCI format 2_0 corresponding to a CORESETPollIndex in a slot. If the UE monitors PDCCH on a serving cell according to search space sets associated with the CORESETPoolIndex and with group index 1, the UE would start monitoring PDCCH on the serving cell according to search space sets associated with the CORESETPoolIndex and with group index 0 and would stop monitoring PDCCH according to search space sets associated with the CORESETPoolIndex and with group index 1 on the serving cell at the beginning of the first slot that is at least P symbols after a slot where a timer associated with the CORESETPoolIndex expires or after a last symbol of a remaining channel occupancy duration for the serving cell that is indicated by DCI format 2_0.

The disclosure further provides exemplary embodiments related to the situation when a UE is not provided with SearchSpaceSwitchTrigger. If a UE is not provided SearchSpaceSwitchTrigger for a serving cell, and if the UE detects a DCI format by monitoring PDCCH according to a search space set associated with a CORESETPoolIndex and with group index 0, the would UE start monitoring PDCCH according to search space sets associated with the CORESETPoolIndex and with group index 1 and would stop monitoring PDCCH according to search space sets associated with the CORESETPoolIndex and with group index 0 on the serving cell at a first slot that is at least P symbols after the last symbol of the PDCCH with the DCI format. The UE would set a timer value associated with the CORESETPoolIndex to the value provided by searchSpaceSwitchingTimer-r16 if the UE detects a DCI format by monitoring PDCCH in any search space set.

Similarly, if a UE is not provided SearchSpaceSwitchTrigger for a serving cell, and if the UE monitors PDCCH on a serving cell according to search space sets associated with a CORESETPoolIndex and with group index 1, the UE would start monitoring PDCCH on the serving cell according to search space sets associated with the CORESETPoolIndex and with group index 0 and would stop monitoring PDCCH according to search space sets sets associated with the CORESETPoolIndex and with group index 1 on the serving cell at the beginning of the first slot that is at least P symbols after a slot where a timer associated with the CORESETPoolIndex expires or, if the UE is provided a search space set associated with the CORESETPoolIndex to monitor PDCCH for detecting a DCI format 2_0, after a last symbol of a remaining channel occupancy duration for the serving cell that is indicated by DCI format 2_0.

In view of the aforementioned descriptions, the present disclosure is suitable for being used in a wireless communication system and is able to more effectively perform scheduling of a UE in an unlicensed band through M-TRP by taking the hardware capability of a UE into consideration.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method used by a user equipment (UE) to communicate to a base station through a multiple transmission and reception point (M-TRP) in an unlicensed band comprising:
receiving, for a communication operation with a network, a configuration comprising multiple CORESETPoolIndexes; and
receiving a physical downlink control channel (PDCCH) according to the configuration;
determining an availability information from the PDCCH, wherein the availability information corresponds to a CORESETPoolIndex and comprises a binary value indicating a valid resource for the CORESETPoolIndex or indicating no valid resource for the CORESETPoolIndex;
stop monitoring the PDCCH corresponding to the CORESETPoolIndex in response to the availability information indicating no valid resource for the CORESETPoolIndex; and
determining a remaining channel occupancy time (COT) according to the PDCCH.

2. The method of claim 1, wherein each of the CORESETPoolIndexes is associated with a priority.

3. The method of claim 1, wherein each of the CORESETPoolIndexes is associated with a CORESETPoolIndex group.

4. The method of claim 1, wherein the PDCCH corresponds to a CORESETPoolIndex which has a highest priority.

5. The method of claim 4, wherein the highest priority is corresponding to a CORESETPoolIndex group.

6. The method of claim 1 further comprising:
receiving a PDCCH corresponding to each CORESETPoolIndex of the multiple CORESETPoolIndexes.

7. The method of claim 6, wherein each CORESETPoolIndex of the multiple CORESETPoolIndexes corresponds to a CORESETPoolIndex group.

8. The method of claim 1, wherein the valid resource is a time period indicated by a next generation NodeB (gNB).

9. The method of claim 8, wherein the time period has a unit of a symbol, a slot, or a millisecond.

10. The method of claim 1, further comprising:
stop monitoring a PDCCH corresponding to a first CORESETPoolIndex of the multiple CORESETPoolIndexes, if a first Channel Occupancy Time (COT) corresponding to the first CORESEPoolIndex is valid as indicated by the availability information and has a lower priority than a second COT corresponding to a second CORESETPoolIndex of the multiple CORESETPoolIndexes, wherein the second COT corresponding to the second CORESETPoolIndex is valid as indicated by the availability information.

11. The method of claim 1, further comprising:
stop monitoring a PDCCH corresponding to a first CORESETPoolIndex of the multiple CORESETPoolIndexes, if a first COT corresponding to the first CORESEPoolIndex is valid as indicated by the availability information and has a lower priority than a second COT corresponding to a second CORESETPoolIndex of the multiple CORESETPoolIndexes, wherein the second COT corresponding to the second CORESETPoolIndex is valid as indicated by the availability information, and the first CORESETPoolIndex has same CORESETPoolIndex group index as the second CORESETPoolIndex.

12. The method of claim 1, wherein the availability information corresponding to a CORESETPoolIndex of the multiple CORESETPoolIndexes indicates there is no valid resource for a time period.

13. The method of claim 12, wherein when the time period is zero, there is a valid resource for a corresponding CORESETPoolIndex of the multiple CORESETPoolIndexes.

14. The method according to claim 13, further comprising:
monitoring a PDCCH corresponding to each CORESETPoolIndex of the multiple CORESETPoolIndexes after the remaining COT if there is no valid resource indicated to the UE by the availability information.

15. The method according to claim 14, further comprising:
monitoring a PDCCH corresponding to a highest priority CORESETPooIndex of the multiple CORESETPoolIndexes which has been indicated as having a valid resource by the availability information.

16. The method according to claim 13, further comprising:
monitoring a PDCCH corresponding to a CORESETPoolIndex of the multiple CORESETPoolIndexes, and the PDCCH has been indicated as a valid resource by the availability information after the remaining COT.

17. The method according to claim 1, further comprising:
monitoring a PDCCH corresponding to a CORESETPoolIndex of the multiple CORESETPoolIndexes having the highest priority after the remaining COT if there is no valid resource indicated to the UE by the availability information.

18. A User Equipment, UE comprising:
a transmitter,
a receiver, and
a processor coupled to the transmitter and the receiver and configured at least to:
receive, via the receiver for a communication operation with a network, a configuration comprising multiple CORESETPoolIndexes; and
receive, via the receiver, a physical downlink control channel (PDCCH) according to the configuration;
determine an availability information from the PDCCH, wherein the availability information corresponds to a CORESETPoolIndex and comprises a binary value indicating a valid resource for the CORESETPoolIndex or indicating no valid resource for the CORESETPoolIndex;
stop monitoring the PDCCH corresponding to the CORESETPoolIndex in response to the availability information indicating no valid resource for the CORESETPoolIndex; and
determine a remaining channel occupancy time (COT) according to the PDCCH.

* * * * *